(12) United States Patent
Suto

(10) Patent No.: US 11,743,449 B2
(45) Date of Patent: Aug. 29, 2023

(54) IMAGING DEVICE AND ELECTRONIC APPARATUS

(71) Applicant: SONY SEMICONDUCTOR SOLUTIONS CORPORATION, Kanagawa (JP)

(72) Inventor: Hiroki Suto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 99 days.

(21) Appl. No.: 17/309,990

(22) PCT Filed: Dec. 18, 2019

(86) PCT No.: PCT/JP2019/049577
§ 371 (c)(1),
(2) Date: Jul. 8, 2021

(87) PCT Pub. No.: WO2020/153054
PCT Pub. Date: Jul. 30, 2020

(65) Prior Publication Data
US 2022/0094907 A1   Mar. 24, 2022

(30) Foreign Application Priority Data
Jan. 22, 2019 (JP) .................. 2019-008272

(51) Int. Cl.
*H04N 17/00* (2006.01)
*H04N 25/79* (2023.01)
*H04N 25/772* (2023.01)

(52) U.S. Cl.
CPC ......... *H04N 17/002* (2013.01); *H04N 25/772* (2023.01); *H04N 25/79* (2023.01)

(58) Field of Classification Search
CPC .. H04N 17/002; H04N 5/37455; H04N 5/379; H04N 5/378; H04N 5/3745;
(Continued)

(56) References Cited

U.S. PATENT DOCUMENTS

2004/0027881 A1* 2/2004 Furukawa ............. G11C 29/48
365/200
2011/0019030 A1   1/2011 Shoyama
(Continued)

FOREIGN PATENT DOCUMENTS

CN   101964876 A   2/2011
CN   110291784 A   9/2019
(Continued)

OTHER PUBLICATIONS

International Search Report and Written Opinion of PCT Application No. PCT/JP2019/049577, dated Mar. 17, 2020, 10 pages of ISRWO.

*Primary Examiner* — Michael E Teitelbaum
(74) *Attorney, Agent, or Firm* — Chip Law Group

(57) ABSTRACT

An imaging device according to the present disclosure has a stacked chip structure in which at least two semiconductor chips, that are a first semiconductor chip provided with a pixel circuit and a second semiconductor chip including an analog-to-digital (AD) conversion circuit which is provided so as to correspond to the pixel circuit, are stacked. The AD conversion circuit includes a latch circuit that retains a digital code after AD conversion and a transfer circuit that transfers the digital code after AD conversion. Further, a failure detection circuit for detecting a failure of the AD conversion circuit is provided. The failure detection circuit performs failure detection by writing a test pattern for failure detection into the latch circuit via the transfer circuit, then reading the test pattern from the latch circuit via the transfer (Continued)

circuit, and comparing the read test pattern with an expected value.

9 Claims, 27 Drawing Sheets

(58) Field of Classification Search
CPC ...... H04N 25/772; H04N 25/79; H04N 25/75; H04N 25/77
See application file for complete search history.

(56) References Cited

U.S. PATENT DOCUMENTS

| | | |
|---|---|---|
| 2011/0102650 A1 | 5/2011 | Shoyama |
| 2012/0016650 A1* | 1/2012 | Hollis ................... G06F 30/367 703/13 |
| 2015/0296164 A1* | 10/2015 | Hirai .................... H04N 5/3765 348/308 |
| 2018/0035108 A1* | 2/2018 | Chae ...................... H04N 5/378 |

FOREIGN PATENT DOCUMENTS

| | | |
|---|---|---|
| JP | 2009-077173 A | 4/2009 |
| JP | 2011-029725 A | 2/2011 |
| JP | 2011-097404 A | 5/2011 |
| JP | 2015-201879 A | 11/2015 |
| JP | 2018-133794 A | 8/2018 |

* cited by examiner

FIG. 15A
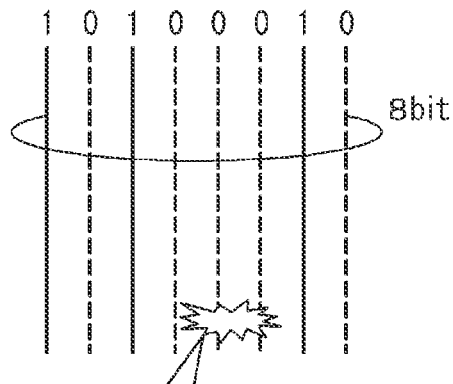
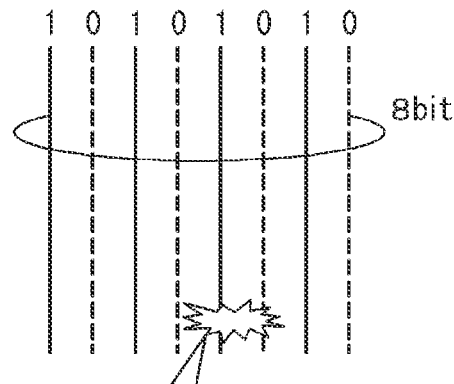
FIG. 15B
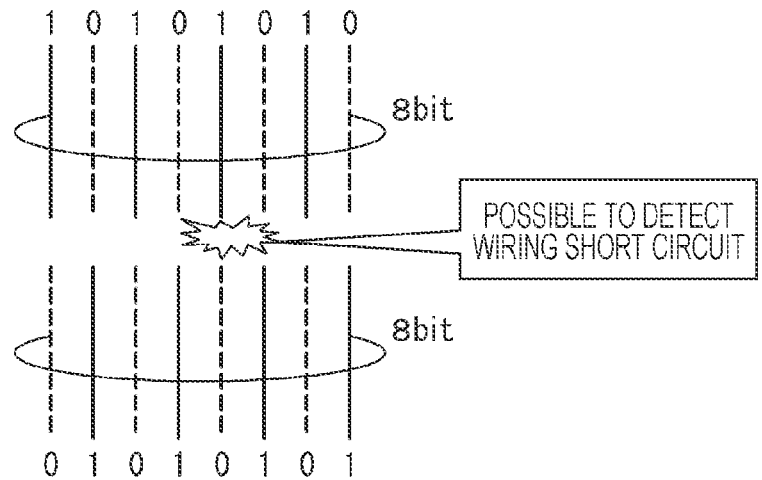

IMAGING DEVICE AND ELECTRONIC APPARATUS

CROSS REFERENCE TO RELATED APPLICATIONS

This application is a U.S. National Phase of International Patent Application No. PCT/JP2019/049577 filed on Dec. 18, 2019, which claims priority benefit of Japanese Patent Application No. JP 2019-008272 filed in the Japan Patent Office on Jan. 22, 2019. Each of the above-referenced applications is hereby incorporated herein by reference in its entirety.

TECHNICAL FIELD

The present disclosure relates to an imaging device and an electronic apparatus.

BACKGROUND ART

During inspection of imaging devices such as CMOS image sensors, especially during sorting inspection in mass production, imaging is actually performed, and the devices are sorted as non-defective devices and defective devices using the imaging signal. Specifically, failure inspection is performed by checking whether or not defects such as white spots and black spots are included in an image based on the imaging signal.

However, in failure inspection based on actual imaging, it is not possible to check the operation of a signal processing unit. In view of this, in order to be able to check the operation of a signal processing unit, an inspection method capable of performing a failure inspection without actually performing imaging has been proposed (see, for example, Patent Document 1). Patent Document 1 discloses a technology which is provided with a retaining unit that retains a pixel signal for each pixel array, and with which operation check based on a desired data signal is enabled by inputting the desired data signal to the retaining unit without performing imaging.

CITATION LIST

Patent Document

Patent Document 1: Japanese Patent Application Laid-Open No. 2009-77173

SUMMARY OF THE INVENTION

Problems to be Solved by the Invention

As an imaging device such as a CMOS image sensor, a so-called column AD imaging device is common which includes analog-to-digital conversion circuits disposed so as to correspond to pixel arrays of a pixel array unit in which pixels are two-dimensionally arrayed in a matrix. On the other hand, in recent years, a so-called pixel-parallel AD imaging device has been developed which includes analog-to-digital conversion circuits provided so as to correspond to pixels (pixel circuits) of a pixel array unit, respectively.

In the pixel-parallel AD imaging device, the area of the analog-to-digital conversion circuits, particularly the area of latch circuits for latching a digital code, is larger than that of the column AD imaging device, and the possibility of a failure is increased accordingly. Therefore, a circuit that enables comprehensive failure detection is required. For example, in an imaging device which has 24 M pixels (6000 horizontal×4000 vertical) and which is of a column AD type, it is typical that latch circuits for two rows in total are mounted on both sides in the vertical direction for reading a pixel signal of the pixel array unit. On the other hand, the imaging device of pixel-parallel AD type is equipped with latch circuits for 4000 lines, which is the same as the number of pixels.

Therefore, in the pixel-parallel AD imaging device, the number of latch circuits is 2000 times larger than that of the column AD imaging device by simple comparison, and a circuit capable of comprehensive failure detection is required. Although the above-mentioned Patent Document 1 discloses a technology for enabling operation check based on a desired data signal without actually performing imaging in a column AD imaging device, the prior art disclosed in Patent Document 1 does not consider comprehensive failure detection for as many latch circuits as pixels and circuits associated therewith in the pixel-parallel AD imaging device.

An object of the present disclosure is to provide an imaging device capable of comprehensive failure detection for a latch circuit provided corresponding to a pixel (pixel circuit) and a circuit associated therewith in a pixel-parallel AD imaging device, and an electronic apparatus including the imaging device.

Solutions to Problems

An imaging device according to the present disclosure for achieving the above object has a stacked chip structure in which at least two semiconductor chips which are a first semiconductor chip and a second semiconductor chip are stacked, the first semiconductor chip being provided with a pixel circuit that includes a photoelectric conversion element, the second semiconductor chip including an analog-to-digital conversion circuit provided so as to correspond to the pixel circuit.

The analog-to-digital conversion circuit includes a latch circuit that retains a digital code after analog-to-digital conversion and a transfer circuit that transfers the digital code after analog-to-digital conversion.

Further, a failure detection circuit for detecting a failure of the analog-to-digital conversion circuit is provided.

The failure detection circuit performs failure detection by writing a test pattern for failure detection into the latch circuit via the transfer circuit, then reading the test pattern from the latch circuit via the transfer circuit, and comparing the read test pattern with an expected value.

Further, the electronic apparatus according to the present disclosure for achieving the above object includes the imaging device configured as described above.

BRIEF DESCRIPTION OF DRAWINGS

FIG. 15A is an explanatory diagram of an alternating pattern used as a test pattern, and FIG. 15B is an explanatory diagram of the meaning of toggling the alternating pattern.

MODE FOR CARRYING OUT THE INVENTION

Figure 1:
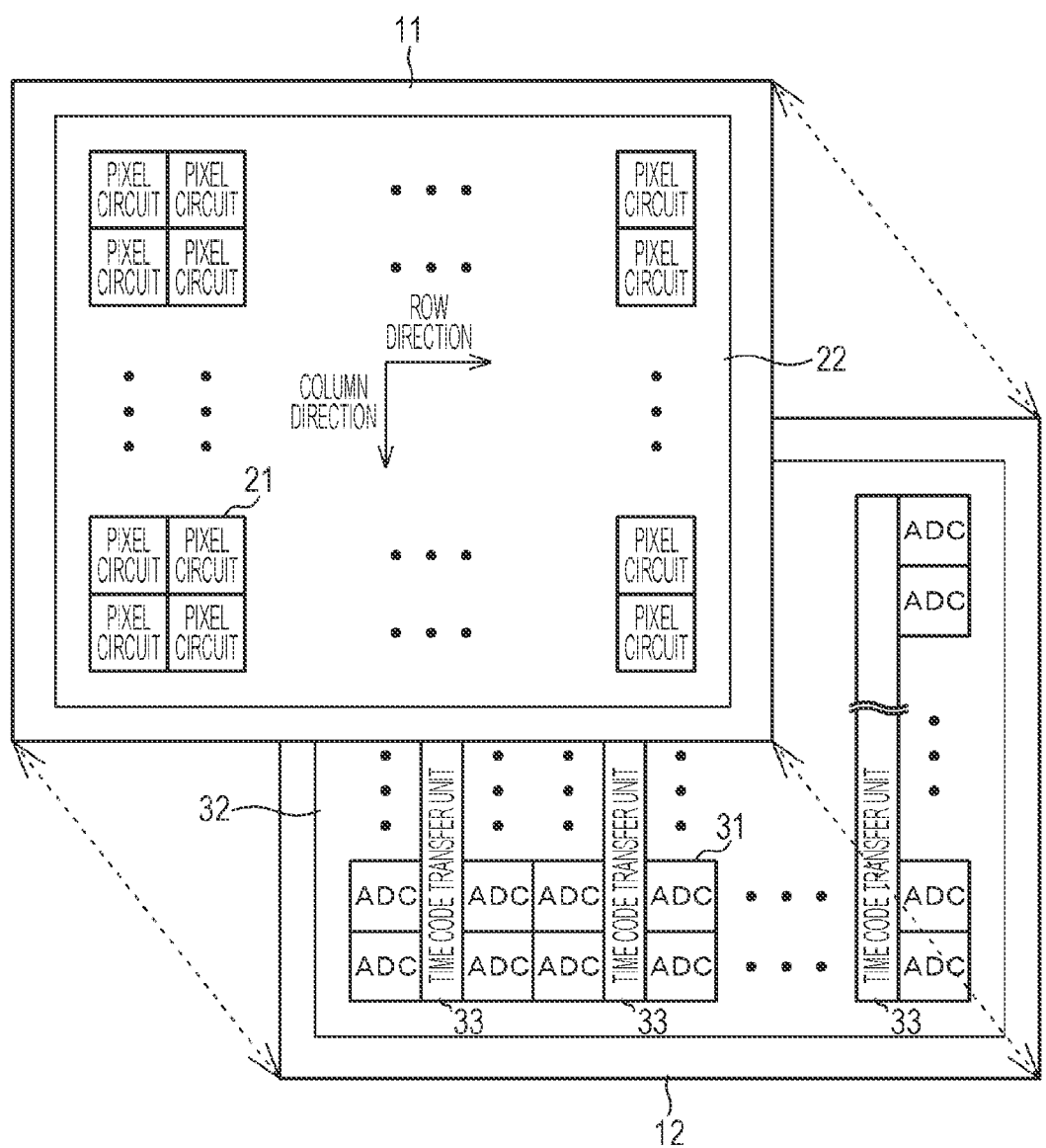
FIG. 1 is an exploded perspective view schematically showing a stacked chip structure of an imaging device according to an embodiment of the present disclosure.

Hereinafter, a mode (hereinafter, referred to as an embodiment) for carrying out the technology according to the present disclosure will be described in detail with reference to the drawings. The technology according to the present disclosure is not limited to the embodiment, and various numerical values, and the like in the embodiment are illustrative. In the following description, the same reference numerals are used for the same elements or elements having the same function, and redundant description will be omitted. Note that the description will be given in the following order.

1. Overall description of imaging device and electronic apparatus according to present disclosure
2. Imaging device according to embodiment
2-1. Configuration example of stacked chip structure
2-2. Configuration example of circuit section of second semiconductor chip
2-3. Configuration example of analog-to-digital conversion circuit
2-4. Configuration example example of data storage unit
2-5. Operation example of analog-to-digital conversion circuit
2-6. Configuration example of time code generation unit
3. Failure detection circuit (built-in self test: BIST) according to embodiment
3-1. Configuration example of test pattern generation unit
3-2. Configuration example of Gray code generator
3-3. Configuration example of expected value comparison unit
3-4. Alternating pattern
3-5. Failure detection processing
3-5-1. Example 1 (basic mode of failure detection processing)
3-5-2. Example 2 (modification of Example 1: example of failure detection during normal operation)
3-5-3. Example 3 (modification of Example 1: example of countermeasure against IR drop)
4. Modifications
5. Applications
6. Examples of application of technology according to present disclosure
6-1. Electronic apparatus according to present disclosure (example of imaging system)
6-2. Application to mobile object
7. Possible configurations of present disclosure <Overall Description of Imaging Device and Electronic Apparatus According to Present Disclosure>

In the imaging device and electronic apparatus according to the present disclosure, a test pattern may be an alternating pattern in which logic "1" and logic "0" are alternately arranged. Further, the test pattern may be a toggle pattern in which the logic of the alternating pattern is inverted in synchronization with a clock signal for generating the test pattern.

In the imaging device and electronic apparatus according to the present disclosure including the above-mentioned preferable configurations and modes, data obtained by performing analog-to-digital conversion on a signal level output from the pixel circuit is defined as D-phase data, and digital data obtained by performing analog-to-digital conversion on a reset level is defined as P-phase data. In this case, the analog-to-digital conversion circuit may have:

a latch circuit for test-pattern writing, a latch circuit for P-phase reading, and a latch circuit for D-phase reading as the latch circuit; and a transfer circuit for test-pattern writing, a transfer circuit for P-phase reading, and a transfer circuit for D-phase reading as the transfer circuit.

Further, in the imaging device and electronic apparatus according to the present disclosure including the above-mentioned preferable configurations and modes, the failure detection circuit may: write the test pattern to the latch circuit for test-pattern writing via the transfer circuit for test-pattern writing; then, read the test pattern from the latch circuit for P-phase reading via the transfer circuit for P-phase reading; then, write again the test pattern to the latch circuit for test-pattern writing via the transfer circuit for test-pattern writing; and then, read the test pattern from the latch circuit for D-phase reading via the transfer circuit for D-phase reading.

Further, in the imaging device and electronic apparatus according to the present disclosure including the above-mentioned preferable configurations and modes, the failure detection circuit may perform expected-value comparison for assessing whether or not the test pattern read from the latch circuit for P-phase reading via the transfer circuit for P-phase reading and the test pattern read from the latch circuit for D-phase reading via the transfer circuit for D-phase reading agree with an expected value. In addition, processing of the expected-value comparison may be performed within a vertical blanking period.

Further, in the imaging device and electronic apparatus according to the present disclosure including the above-mentioned preferable configurations and modes, when the transfer circuit is divided into groups in a unit of a predetermined number, the failure detection circuit partially performs failure detection for each of the groups when executing failure detection of the transfer circuit.

<Imaging Device According to Embodiment>
[Configuration Example of Stacked Chip Structure]

The imaging device according to the embodiment of the present disclosure has a stacked chip structure in which at least two semiconductor chips, a first semiconductor chip and a second semiconductor chip, are stacked. FIG. 1 shows an exploded perspective view of the stacked chip structure of the imaging device according to the embodiment of the present disclosure.

The stacked chip structure shown in FIG. 1 has a two-layer structure in which two semiconductor chips, a first semiconductor chip 11 and a second semiconductor chip 12, are stacked. Here, a two-layer structure in which two semiconductor chips are stacked is described as the stacked chip structure, but a multilayer structure in which three or more semiconductor chips are stacked may also be used.

In the chip structure having a two-layer structure, the first semiconductor chip 11 in the first layer is a pixel chip including a pixel array unit 22 in which pixel circuits 21 including photoelectric conversion elements (for example, photodiodes) are two-dimensionally arrayed in a matrix. The second semiconductor chip 12 in the second layer is a circuit chip provided with a circuit section including an analog-to-digital conversion unit 32 which has a set of analog-to-digital conversion (ADC) circuits 31 arranged corresponding to the pixel circuits 21 which are two-dimensionally arrayed in a matrix.

As described above, the imaging device according to the present disclosure has a stacked chip structure, and is a pixel-parallel AD imaging device in which the analog-to-digital conversion circuits 31 are arranged so as to correspond to the pixel circuits 21 of the first semiconductor chip 11, respectively. The pixel circuits 21 of the first semiconductor chip 11 in the first layer and the analog-to-digital conversion circuits 31 of the second semiconductor chip 12 in the second layer are respectively connected to each other via connection sections 23 (see FIG. 3) such as Cu—Cu connection (copper-copper connection).

Each of the pixel circuits 21 on the first semiconductor chip 11 converts a signal charge of an amount of charge corresponding to an amount of light received by the photoelectric conversion element (for example, photodiode) in the pixel into an electric signal to obtain a pixel signal $V_{sig}$ in analog form, and supplies it to the analog-to-digital conversion circuit 31 on the second semiconductor chip 12 via the connection section 23.

More specifically, the pixel circuit 21 generates a reset level and a signal level as the pixel signal $V_{sig}$ in analog form. Here, the reset level is a voltage when a floating diffusion FD of the pixel circuit 21 is reset after the start of exposure. The signal level is a voltage corresponding to an amount of exposure at the end of exposure. The pixel circuit 21 supplies the reset level and the signal level to the analog-to-digital conversion circuit 31 in this order.

[Configuration Example of Circuit Section of Second Semiconductor Chip]

Figure 2:
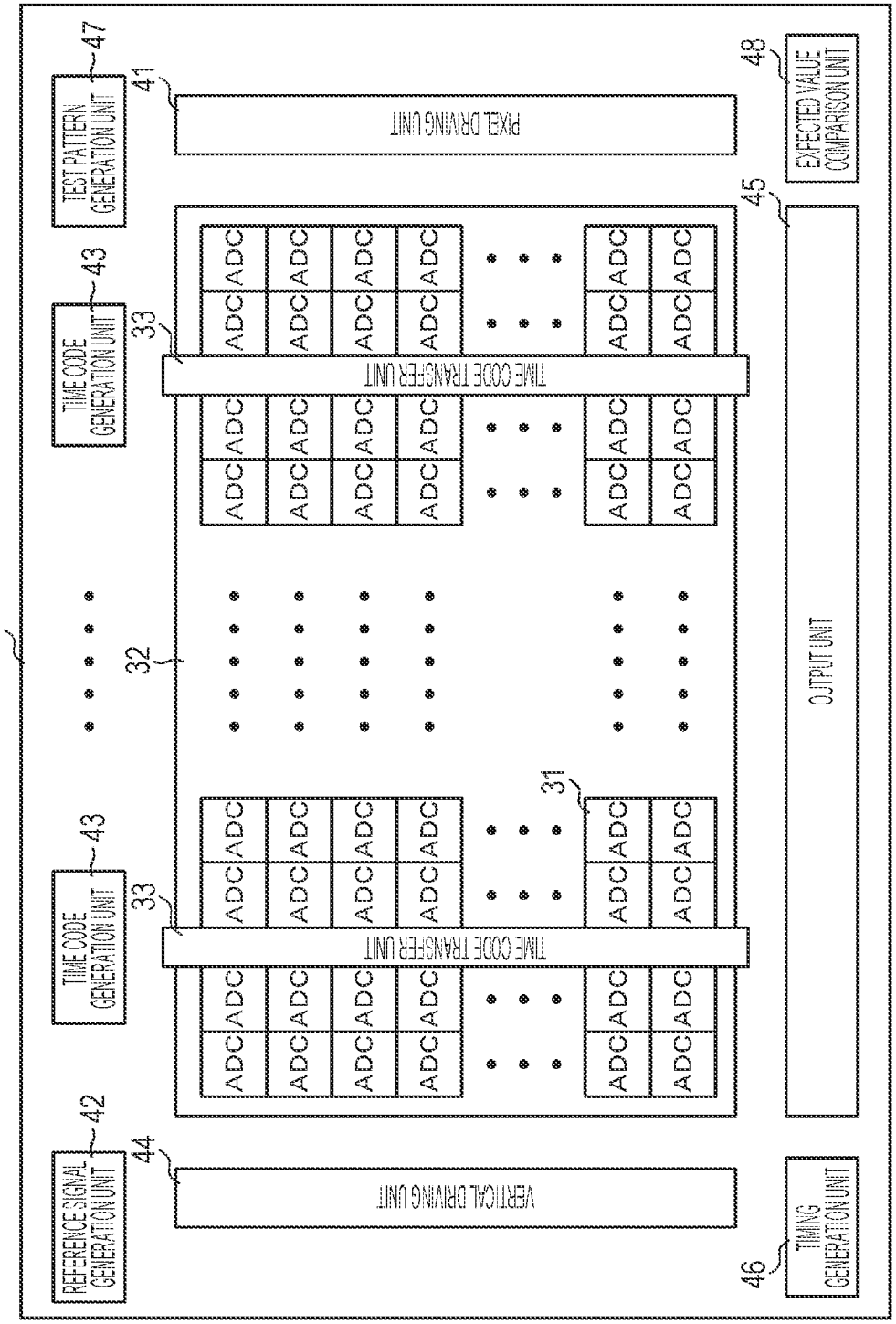
FIG. 2 is a block diagram showing a specific configuration example of a pixel array unit in the imaging device according to the embodiment of the present disclosure.

FIG. 2 shows a block diagram illustrating a specific configuration example of the circuit section, that is, the circuit section including the analog-to-digital conversion unit 32, of the second semiconductor chip 12 in the imaging device according to the embodiment of the present disclosure.

Around the analog-to-digital conversion unit 32 on the second semiconductor chip 12, a circuit section is formed which includes a pixel driving unit 41, a reference signal generation unit 42, a time code generation unit 43, a vertical driving unit 44, an output unit 45, a timing generation unit 46, a test pattern generation unit 47, an expected value comparison unit 48, and the like. The functions of each component of the circuit section of the second semiconductor chip 12 will be specifically described below.

The pixel driving unit 41 drives the pixel circuits 21 on the first semiconductor chip 11. The reference signal generation unit 42 includes a digital-to-analog conversion (DAC) circuit and the like, and generates a so-called ramp waveform reference signal $V_{ref}$ in which a level (voltage) decreases monotonically with time as a reference voltage signal used for analog-to-digital conversion. The ramp waveform reference signal $V_{ref}$ is given to each analog-to-digital conversion circuit 31 of the analog-to-digital conversion unit 32. The analog-to-digital conversion circuit 31 is a so-called single-slope analog-to-digital conversion circuit.

A plurality of time code generation units 43 is provided. Further, the analog-to-digital conversion unit 32 is provided with the same number of time code transfer units 33 as the time code generation units 43. That is, the time code generation unit 43 and the time code transfer unit 33 are provided in a one-to-one correspondence relationship. The time code transfer unit 33 transfers a time code generated by the time code generation unit 43.

The time code generation unit 43 generates a time code to be used for converting the pixel signal $V_{sig}$ in analog form supplied from the pixel circuit 21 into a digital signal in the analog-to-digital conversion circuit 31, and supplies the corresponding time code to the time code transfer unit 33. The details of the time code generation unit 43 will be described later.

The time code represents the time at which the pixel signal $V_{sig}$ in analog form and the ramp waveform reference signal $V_{ref}$ agree with each other during the analog-to-digital conversion, and represents data indicating that the pixel signal $V_{sig}$ is the reference voltage at that time, that is, a digitized light intensity value.

The vertical driving unit 44 performs driving to cause the output unit 45 to output the pixel signal digitized by each analog-to-digital conversion circuit 31 of the analog-to-digital conversion unit 32 on the basis of a timing signal supplied from the timing generation unit 46.

Under the driving of the vertical driving unit 44, the output unit 45 performs predetermined digital signal processing on the pixel signals supplied from the respective analog-to-digital conversion circuits 31 of the analog-to-digital conversion unit 32, and then outputs the resultant signals to the outside of the second semiconductor chip 12. Examples of the predetermined digital signal processing include black level correction processing and correlated double sampling (CDS) processing.

The timing generation unit 46 includes a timing generator for generating various timing signals, or the like, and supplies the generated various timing signals to the pixel driving unit 41, the reference signal generation unit 42, the vertical driving unit 44, the output unit 45, etc.

The test pattern generation unit 47 and the expected value comparison unit 48 are used for failure detection by a failure detection circuit (built-in self test: BIST) described later. The test pattern generation unit 47 generates a test pattern to be used for failure detection (failure inspection). The details of the test pattern generation unit 47 will be described later.

The expected value comparison unit 48 compares an output value of the failure detection circuit with an expected value, and outputs an assessment result of a non-defective product/defective product on the basis of the failure detection. The details of the expected value comparison unit 48 will be described later.

[Configuration Example of Analog-to-Digital Conversion Circuit]

Figure 3:
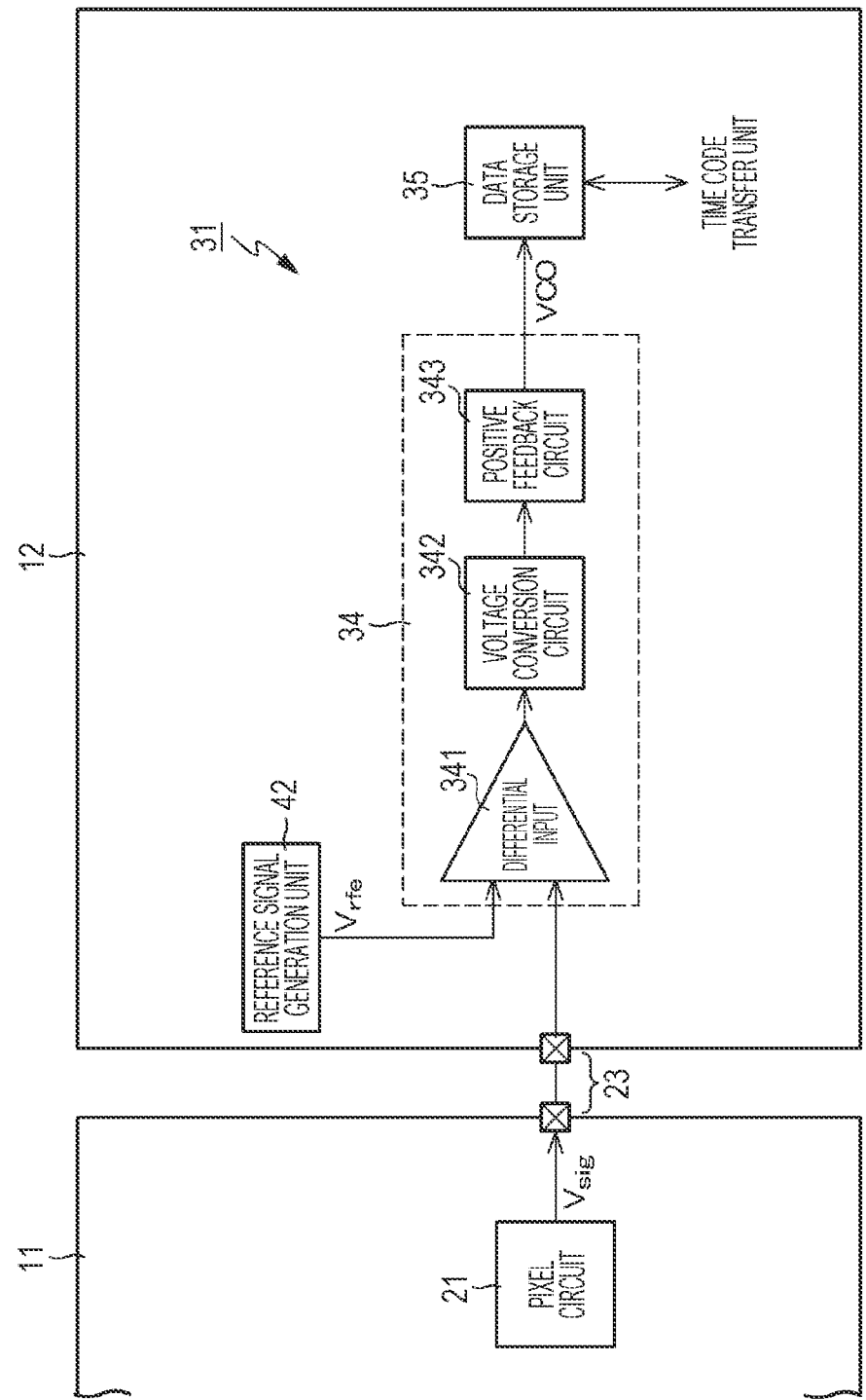
FIG. 3 is a block diagram showing a specific configuration example of an analog-to-digital conversion circuit in the imaging device according to the embodiment of the present disclosure.

FIG. 3 is a block diagram showing a specific configuration example of the analog-to-digital conversion circuit 31 in the imaging device according to the embodiment of the present disclosure. Here, one analog-to-digital conversion circuit 31 corresponding to one pixel circuit 21 is illustrated.

The pixel signal $V_{sig}$ in analog form output from the pixel circuit 21 on the first semiconductor chip 11 is supplied to the analog-to-digital conversion circuit 31 on the second semiconductor chip 12 through the connection section 23 such as a Cu—Cu connection. A reset level and a signal level are input in this order to the analog-to-digital conversion circuit 31 as the pixel signal $V_{sig}$ in analog form. Further, the ramp waveform reference signal $V_{ref}$ generated by the reference signal generation unit 42 is supplied to the analog-to-digital conversion circuit 31.

The analog-to-digital conversion circuit 31 includes a comparison circuit 34 and a data storage unit 35, and converts the pixel signal $V_{sig}$ (reset level/signal level) in analog form into a digital signal. In the following, data obtained by performing analog-to-digital conversion on the reset level is referred to as "P-phase data", and data obtained by performing analog-to-digital conversion on the signal level is referred to as "D-phase data".

The comparison circuit 34 includes a differential input circuit 341, a voltage conversion circuit 342, and a positive feedback circuit 343.

The differential input circuit 341 compares the pixel signal $V_{sig}$ in analog form supplied from the pixel circuit 21 with the ramp waveform reference signal $V_{ref}$ supplied from the reference signal generation unit 42, and when the pixel signal $V_{sig}$ is larger than the reference signal $V_{ref}$, supplies a signal (current) indicating the comparison result to the voltage conversion circuit 342.

The voltage conversion circuit 342 converts the signal (current) which is supplied from the differential input circuit 341 and which indicates the comparison result between the pixel signal $V_{sig}$ and the reference signal $V_{ref}$ into a voltage, and supplies the obtained voltage to the positive feedback circuit 343.

The positive feedback circuit 343 supplies, to the data storage unit 35, a comparison result signal VCO which is logically inverted when the pixel signal $V_{sig}$ is higher than the reference signal $V_{ref}$ as the comparison result of the comparison circuit 34 on the basis of the output signal of the voltage conversion circuit 342. Further, the positive feedback circuit 343 increases the transition speed when the comparison result signal VCO is inverted.

The data storage unit 35 retains the time code when the comparison result signal VCO of the comparison circuit 34 is logically inverted. Then, the data storage unit 35 outputs the time code corresponding to the reset level as P-phase data. Further, the data storage unit 35 outputs the time code corresponding to the signal level as D-phase data.

[Configuration Example of Data Storage Unit]

Figure 4:
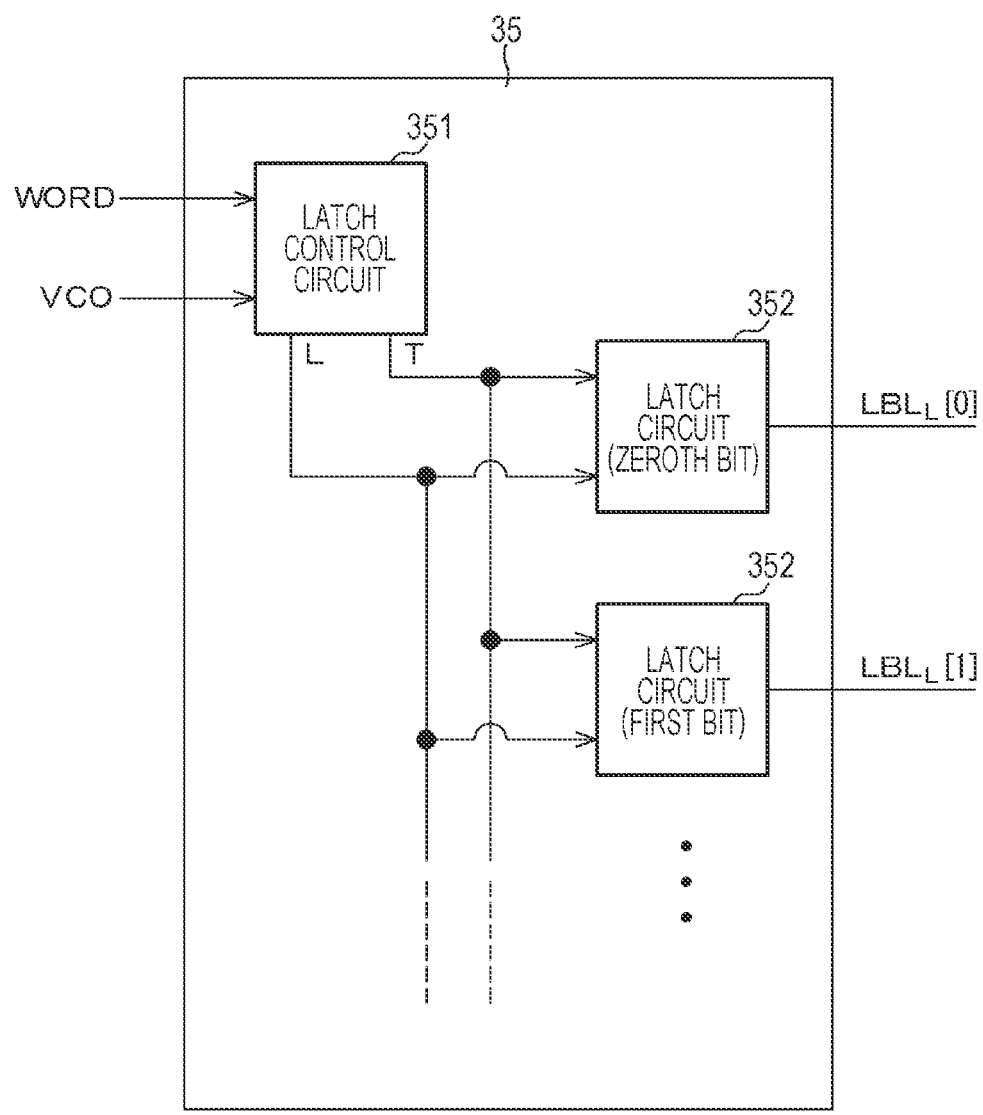
FIG. 4 is a block diagram showing a basic configuration example of a data storage unit of the analog-to-digital conversion circuit in the imaging device according to the embodiment of the present disclosure.

FIG. 4 is a block diagram showing a specific configuration example of the data storage unit 35 of the analog-to-digital conversion circuit 31 in the imaging device according to the embodiment of the present disclosure.

The data storage unit 35 has a latch circuit control unit 351 and D (D is an integer) latch circuits 352, the D being the same number as the bit length of the D-phase data. The latch circuit control unit 351 latches the value (logical value "0" or "1") of the comparison result signal VCO of the comparison circuit 34 in one of the D latch circuits 352 according to a control signal WORD from the vertical driving unit 44 (see FIG. 2).

The latch circuits 352 are connected to the time code transfer unit 33 via local bit lines $LBL_L$. Then, the latch circuits 352 hold the time code when the comparison result signal VCO of the comparison circuit 34 is logically inverted under the control of the latch circuit control unit 351.

[Operation Example of Analog-to-Digital Conversion Circuit]

Figure 5:
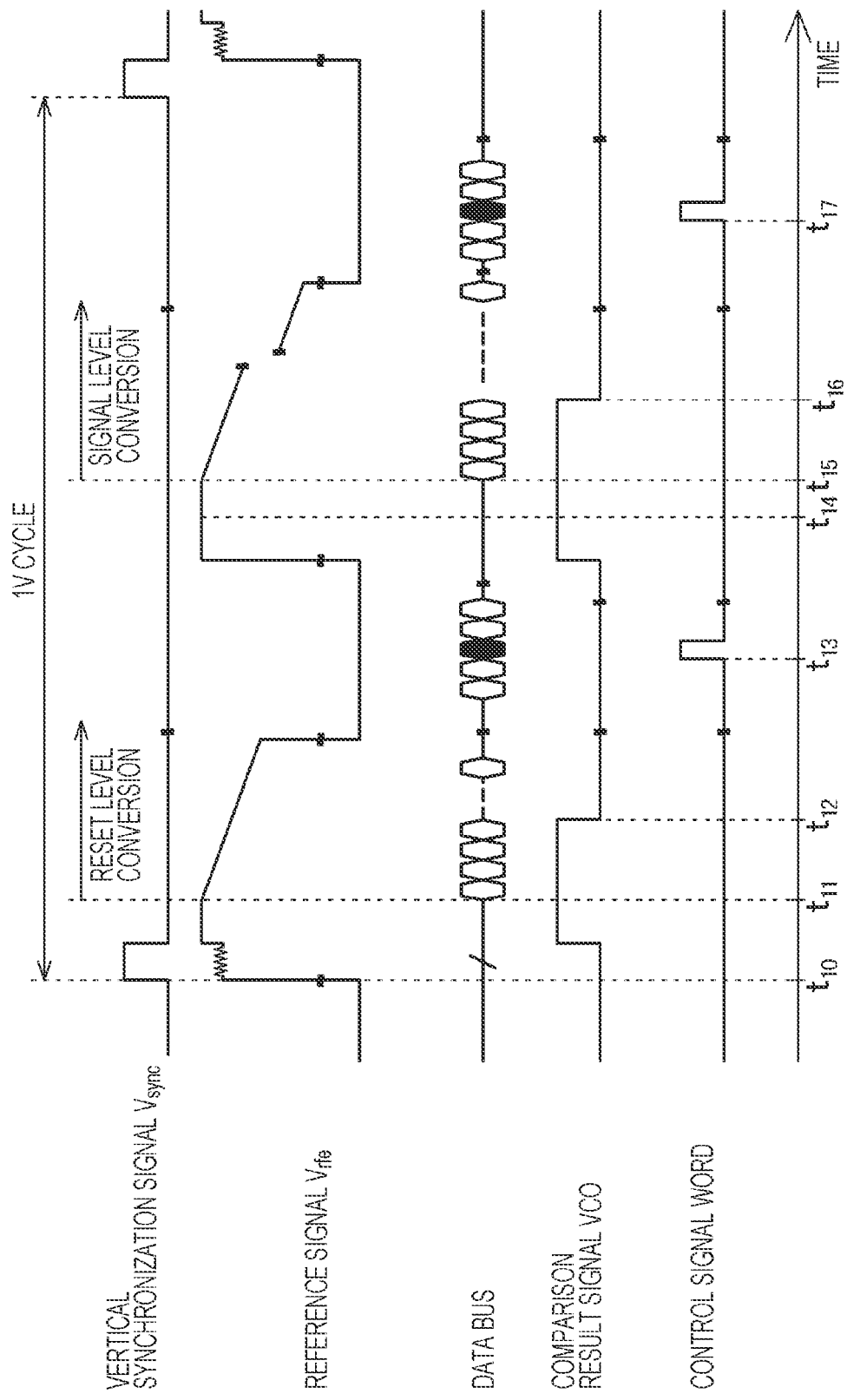
FIG. 5 is a timing waveform diagram used for describing an operation example of the analog-to-digital conversion circuit in the imaging device according to the embodiment of the present disclosure.

Here, the operation of the analog-to-digital conversion circuit 31 which includes the data storage unit 35 having the above configuration will be described with reference to FIG. 5. FIG. 5 is a timing waveform diagram used for describing the operation example of the analog-to-digital conversion circuit 31 in the imaging device according to the embodiment of the present disclosure.

The operation of the analog-to-digital conversion circuit 31 is executed in a unit of 1V cycle which is the cycle of a vertical synchronization signal $V_{sync}$. Then, it is assumed that the exposure of all the pixels is started before a start time $t_{10}$ of the 1V cycle. At time $t_{11}$, the reference signal generation unit 42 starts generating the ramp waveform reference signal $V_{ref}$ whose level (voltage) monotonically decreases with time.

In the timing waveform diagram of FIG. 5, a data bus is the data of a repeater circuit in the time code transfer unit 33 (see FIG. 2). The latch circuit control unit 351 of the data storage unit 35 continues to write the data transmitted from the time code transfer unit 33 to the latch circuits 352 via the local bit lines LBL, and stops writing data at time $t_{12}$ at which the comparison result signal VCO of the comparison circuit 34 is logically inverted.

At time t13, the control signal WORD changes from a low level to a high level, and in response to this change, the latch circuit control unit 351 reads out the data written in the latch circuits 352. The read data is held in a memory (for example, a D-type flip-flop 51 shown in FIG. 16) in the time code transfer unit 33. This data is a digital value (P-phase data) obtained by converting the voltage value of the floating diffusion FD of the pixel circuit 21 and the reset level including an offset of the circuit. The P-phase data is read from the memory in the time code transfer unit 33 and held in a memory (for example, SRAM 52 shown in FIGS. 15A and 15B) in the output unit 45 (see FIG. 2).

Exposure of all pixels ends at time $t_{14}$. After that, at time $t_{15}$, the reference signal generation unit 42 starts generating the ramp waveform reference signal $V_{ref}$. Then, the latch circuit control unit 351 continues to write the data transmitted from the time code transfer unit 33 to the latch circuits 352 via the local bit lines LBL, and stops writing data at time $t_{16}$ at which the comparison result signal VCO of the comparison circuit 34 is logically inverted.

At time t17, the control signal WORD changes from a low level to a high level, and in response to this change, the latch circuit control unit 351 reads out the data written in the latch circuits 352. The read data is held in the memory in the time code transfer unit 33. This data has a digital value (D-phase data) obtained by converting the signal level. The D-phase data is read from the memory in the time code transfer unit 33 and held in a memory (for example, SRAM 53 shown in FIGS. 15A and 15B) in the output unit 45.

In the output unit 45, correlated double sampling (CDS) processing is performed for removing fixed pattern noise of pixels by taking the difference between the D-phase data and the P-phase data for each pixel. Then, the data after the CDS processing is output to the outside as substantial pixel data.

[Configuration Example of Time Code Generation Unit]

Figure 6:
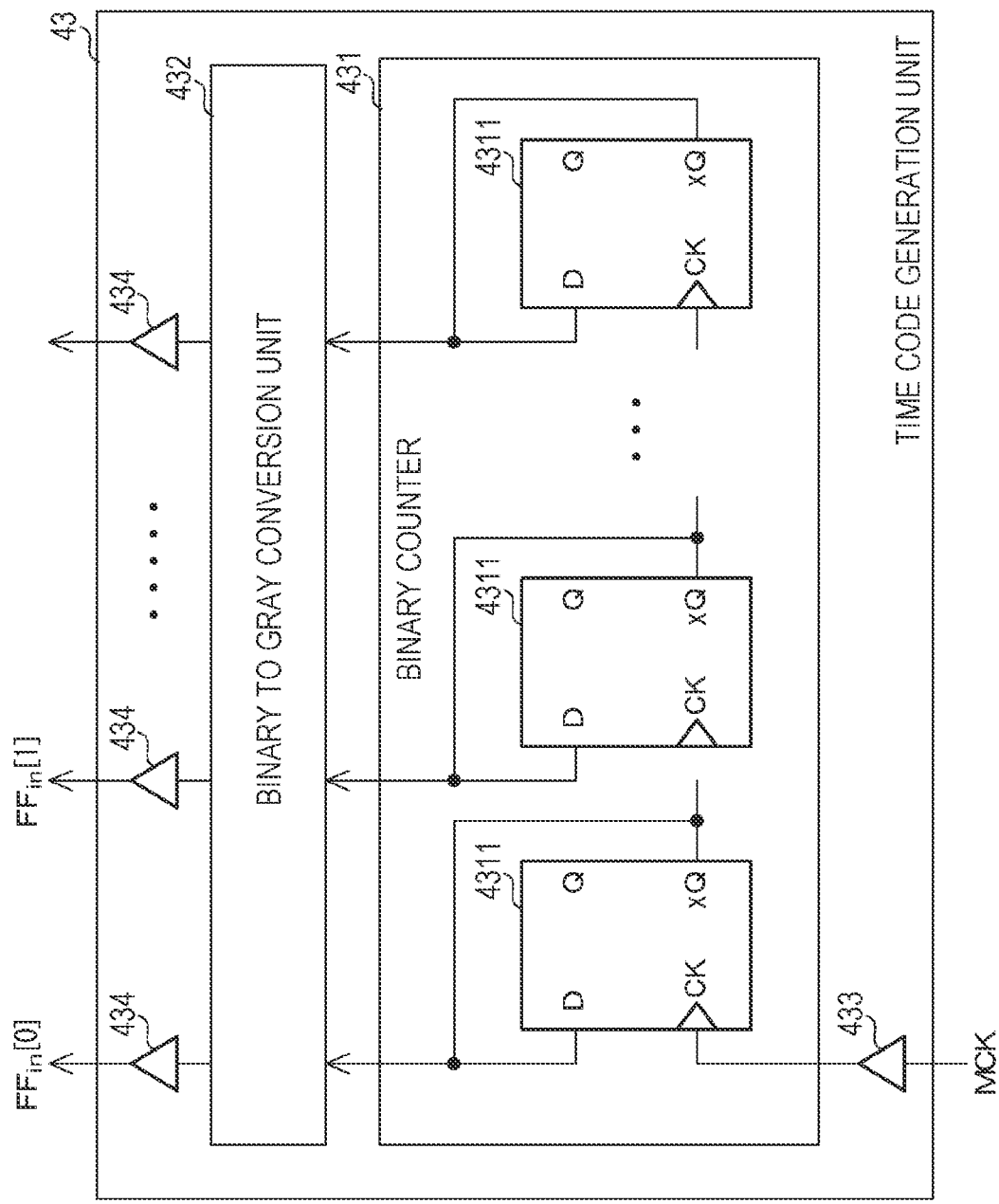
FIG. 6 is a block diagram showing a specific configuration example of a time code generation unit in the imaging device according to the embodiment of the present disclosure.

FIG. 6 is a block diagram showing a specific configuration example of the time code generation unit in the imaging device according to the embodiment of the present disclosure.

The time code generation unit 43 according to the present embodiment has a binary counter 431, a binary to Gray conversion unit 432, a receiver 433, and a plurality of drivers 434, and generates a time code to be used for analog-to-digital conversion in the analog-to-digital conversion circuit 31.

The binary counter 431 counts a binary count value in synchronization with a master clock MCK input through the receiver 433. The binary counter 431 includes multi-stage D flip-flops 4311.

In the binary counter 431, the master clock MCK is input to a clock terminal CK of the flip-flop 4311 in the first stage. An xQ output (inverted output of the Q output) of the flip-flop 4311 in the previous stage is input to a clock terminal CK of the flip-flop 4311 in the second and subsequent stages. Then, the xQ output of the flip-flop 4311 of each stage is used as the D input of the flip-flop 4311, and is supplied to the binary to Gray conversion unit 432 as a bit of the corresponding digit.

The binary to Gray conversion unit 432 converts the binary count value supplied from the binary counter 431 into a Gray code, and outputs it as a time code. The driver 434 is provided for each bit in the time code, and the drivers 434 output corresponding bits $FF_{in}[0]$, $FF_{in}[1]$, . . . of the time code, respectively.

<Failure Detection Circuit According to Embodiment>

Subsequently, the failure detection circuit (BIST) according to the embodiment of the present disclosure will be described. The failure detection circuit according to the present embodiment is used to detect a failure of the latch circuits 352 of the analog-to-digital conversion circuit 31, the circuits associated therewith (for example, the repeater circuit in the time code transfer unit 33), etc., in addition to disconnection and short circuit of wiring. The failure detection circuit includes the test pattern generation unit 47 that generates a test pattern, and the expected value comparison unit 48 that compares an output value (hereinafter, may be referred to as "BIST output value") of the failure detection circuit with an expected value.

The specific configurations of the test pattern generation unit 47 and the expected value comparison unit 48 will be described below.

[Test Pattern Generation Unit]

Figure 7:
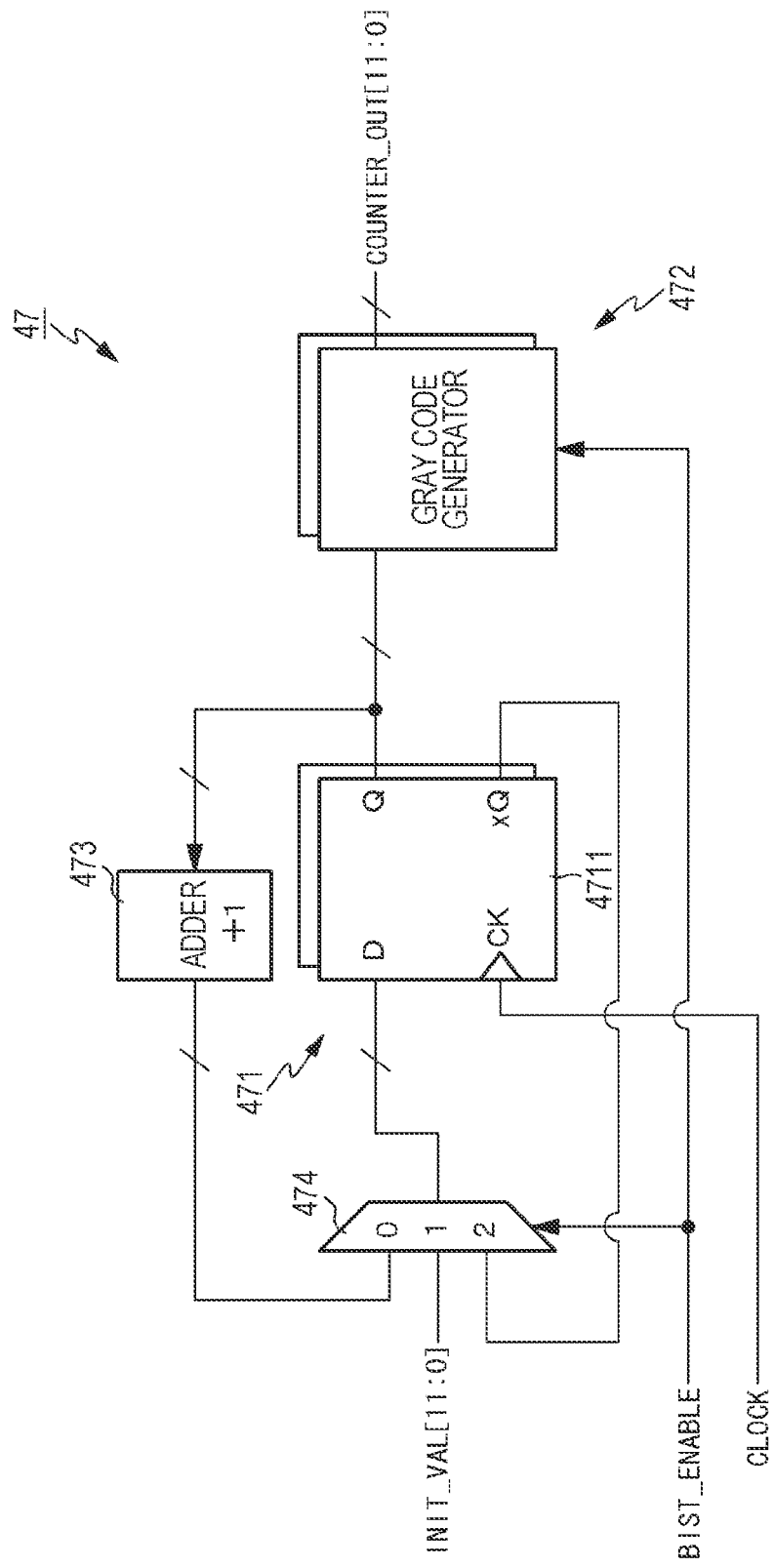
FIG. 7 is a block diagram showing a specific configuration example of a test pattern generation unit in the imaging device according to the embodiment of the present disclosure.

FIG. 7 shows a specific configuration example of the test pattern generation unit 47 in the imaging device according to the embodiment of the present disclosure.

The test pattern generation unit 47 includes a binary counter 471, a Gray code generator 472, an adder 473, and a selector 474, and generates a test pattern used for failure detection.

The binary counter 471 includes D-type flip-flops 4711 in the same number of stages as the bit length of the test pattern. In the binary counter 471, a clock signal CLOCK is input to a clock terminal CK of the flip-flop 4711 in the first stage. The operation of the binary counter 471 is basically the same as the operation of the binary counter 431 of the time code generation unit 43.

In the binary counter 471, a Q output of the flip-flop 4711 in each stage is supplied to the Gray code generator 472 as a bit of the corresponding digit, and is given to the selector 474 as a first input (0) thereof via the adder 473. Further, the xQ output (inverted output of the Q output) of the flip-flop 4711 is given to the selector 474 as its third input (2).

During normal counting operation, the Gray code generator 472 converts the binary count value counted by the binary counter 471 into a Gray code in response to a failure detection permission signal BIST_ENABLE, and outputs the resultant as output data COUNTER_OUT[11:0] of the test pattern generation unit 47. The details of the Gray code generator 472 will be described later.

The adder 473 counts up (+1) the Q output of the flip-flop 4711 and supplies it to the selector 474 as its first input (0).

The selector 474 uses a test pattern initial value INIT_VAL[11:0] as the second input (1). On the basis of the failure detection permission signal BIST_ENABLE, the selector 474 selects the second input (1) or the third input (2) during the failure detection (BIST) operation, and selects the first input (0) during the normal counting operation, and uses the selected input as the D input of the flip-flop 4711.

In the binary counter 471 having the above configuration, when the selector 474 selects the first input (0), the normal counting operation is performed. Specifically, during the normal counting operation, the Q output of the flip-flop 4711 is used as the D input of the flip-flop 4711, and the data converted into the Gray code by the Gray code generator 472 is output as output data COUNTER_OUT [11:0] of the test pattern generation unit 47.

When the selector 474 selects the second input (1), the test pattern initial value INIT_VAL[11:0] of an arbitrary code is set in the binary counter 471. Then, the output data of the binary counter 471 goes through the Gray code generator 472, and is output as the output data COUNTER_OUT[11:0] of the test pattern generation unit 47.

Then, when the selector 474 selects the third input (2), the failure detection (BIST) operation is performed. Specifically, during the failure detection operation, the xQ output of the flip-flop 4711 is used as the D input of the flip-flop 4711, so that, in the binary counter 471, a toggle operation in which the logic "1" and the logic "0" of the Q output of the flip-flop 4711 are inverted in synchronization with the clock signal CLOCK is performed. Then, the binary count value of the binary counter 471 goes through the Gray code generator 472, and is output as a toggle pattern.

Figure 8:
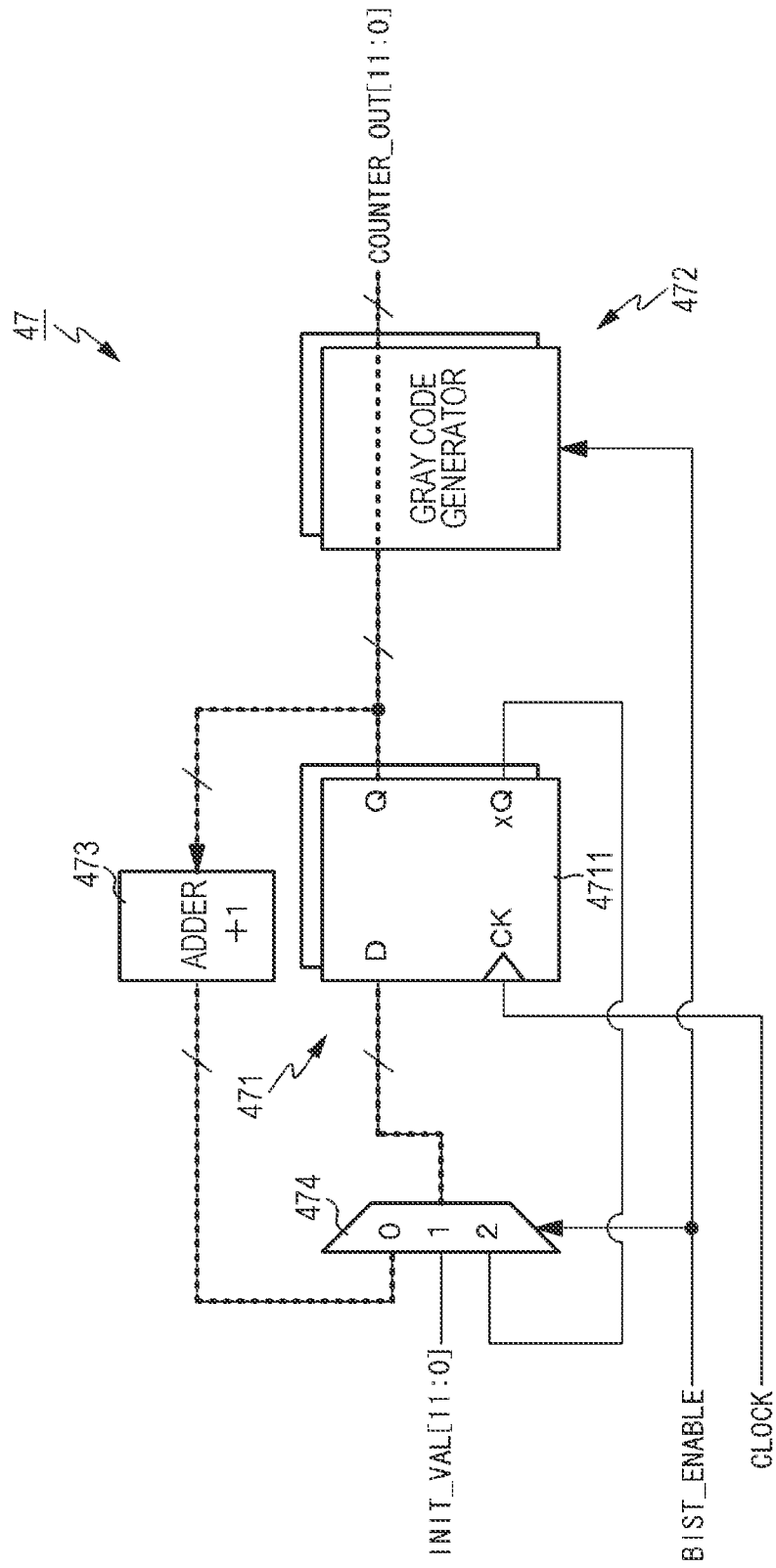
FIG. 8 is a diagram showing a signal path (dotted line) during a normal counting operation by the test pattern generation unit.
Figure 9:
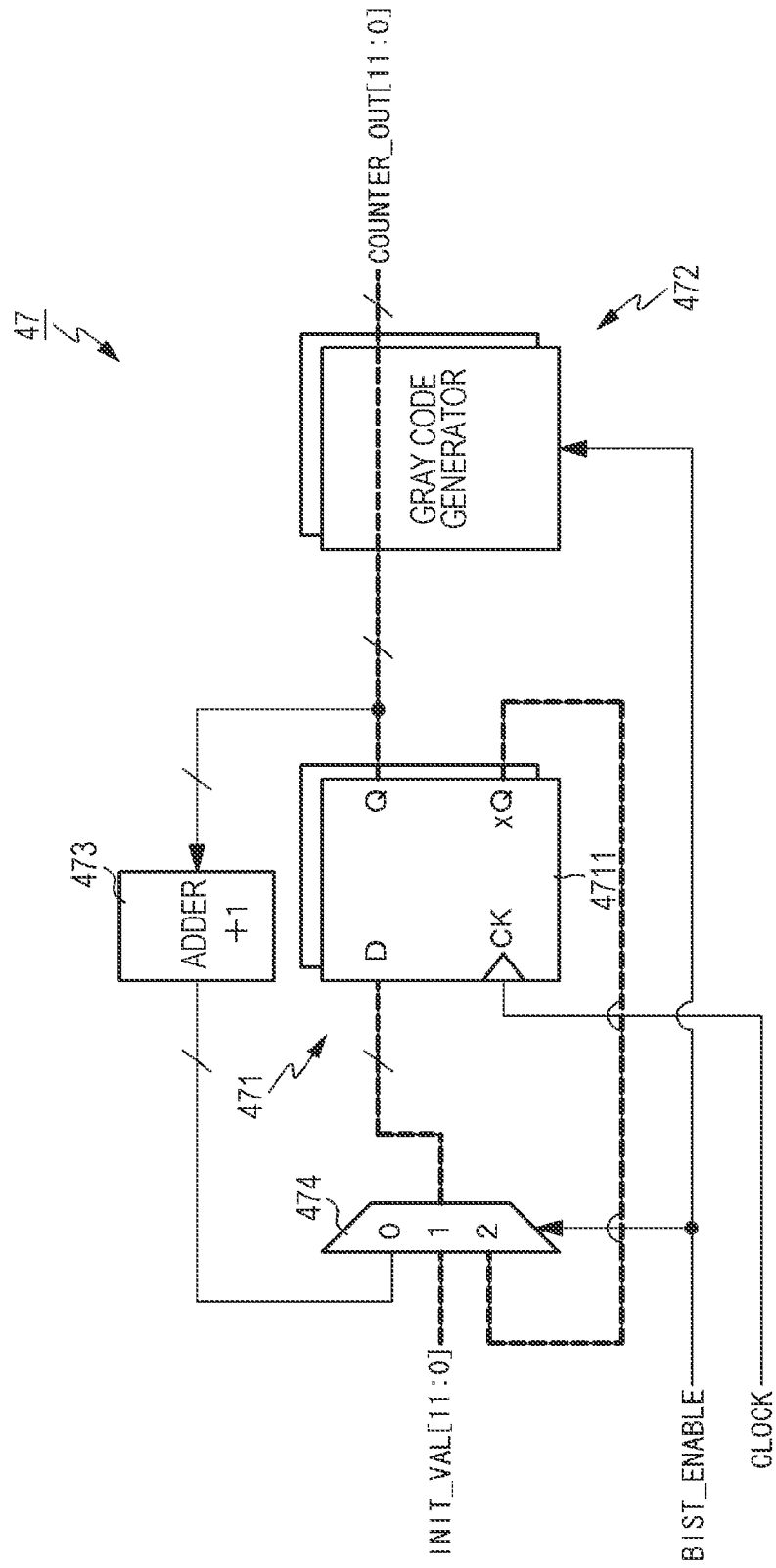
FIG. 9 is a diagram showing a signal path (broken line) during a failure detection (BIST) operation by the test pattern generation unit.
Figure 10:
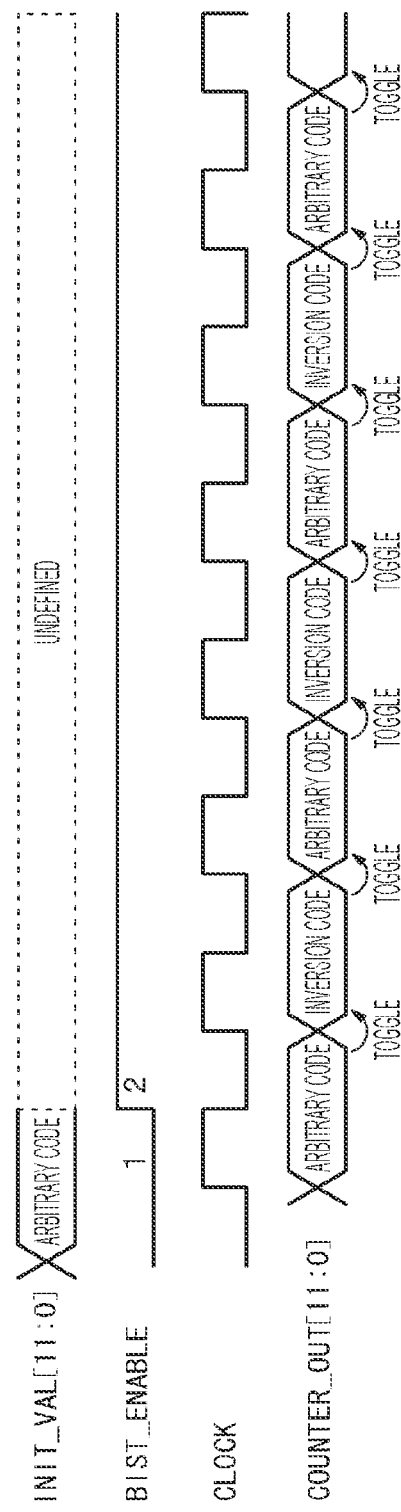
FIG. 10 is a timing waveform diagram showing a timing relationship among respective signals in the test pattern generation unit.

A signal path during the normal counting operation is indicated by a dotted line in FIG. 8, and a signal path during the failure detection (BIST) operation is indicated by a broken line in FIG. 9. Further, FIG. 10 shows a timing waveform diagram of respective signals in the test pattern generation unit 47. The timing waveform diagram of FIG. 10 shows a timing relationship among the test pattern initial value INIT_VAL[11:0], the failure detection permission signal BIST_ENABLE, the clock signal CLOCK, and the output data COUNTER_OUT[11:0] of the test pattern generation unit 47.

The test pattern generation unit 47 having the above configuration has a circuit configuration capable of generating a toggle pattern in which the Q output of the flip-flop 4711 is toggled as a test pattern in synchronization with the clock signal CLOCK by applying the flip-flop 4711 used as the binary counter 471 during the normal counting operation. By using the toggle pattern as a test pattern, it is possible to improve the comprehensiveness of failure detection (sorting of defective product) as described later.

[Configuration Example of Gray Code Generator]

Figure 11:
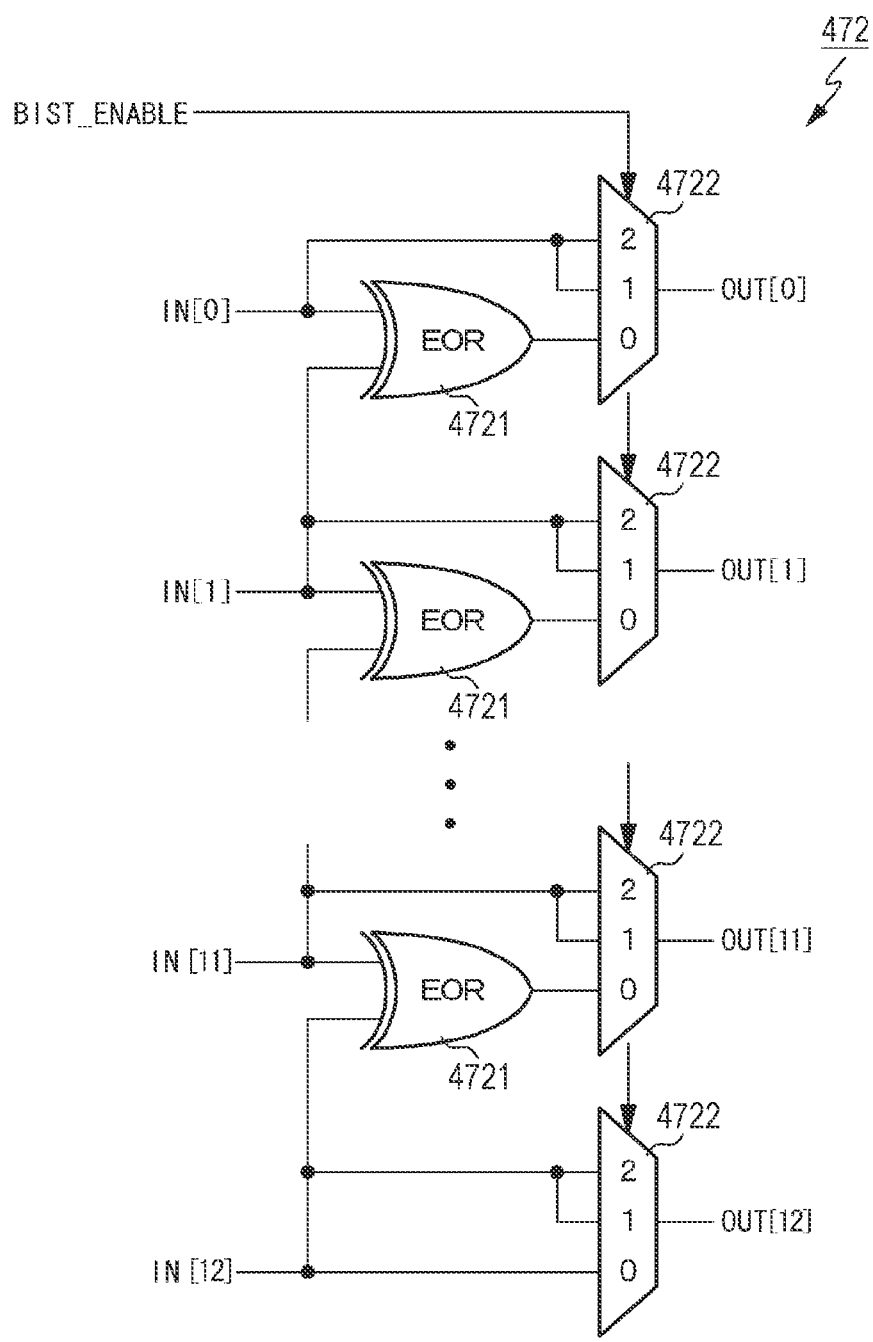
FIG. 11 is a block diagram showing a specific configuration example of a Gray code generator in the test pattern generation unit.

FIG. 11 shows a specific configuration example of the Gray code generator 472 in the test pattern generation unit 47.

The Gray code generator 472 includes a plurality of exclusive OR circuits (EOR) 4721 and selectors 4722 which are one more than the exclusive OR circuits 4721. The plurality of exclusive OR circuits 4721 converts the binary code (binary count value) output from the binary counter 471 into Gray codes.

The selectors 4722 use the Gray codes output from the plurality of exclusive OR circuits 4721 as their first inputs (0), and the binary code output from the binary counter 471 as their second inputs (1) and third inputs (2). Then, the selectors 4722 select the Gray codes output from the plurality of exclusive OR circuits 4721 during the normal counting operation, and selects the binary code output from the binary counter 471 during the failure detection (BIST) operation, on the basis of the failure detection permission signal BIST_ENABLE.

Figure 12:
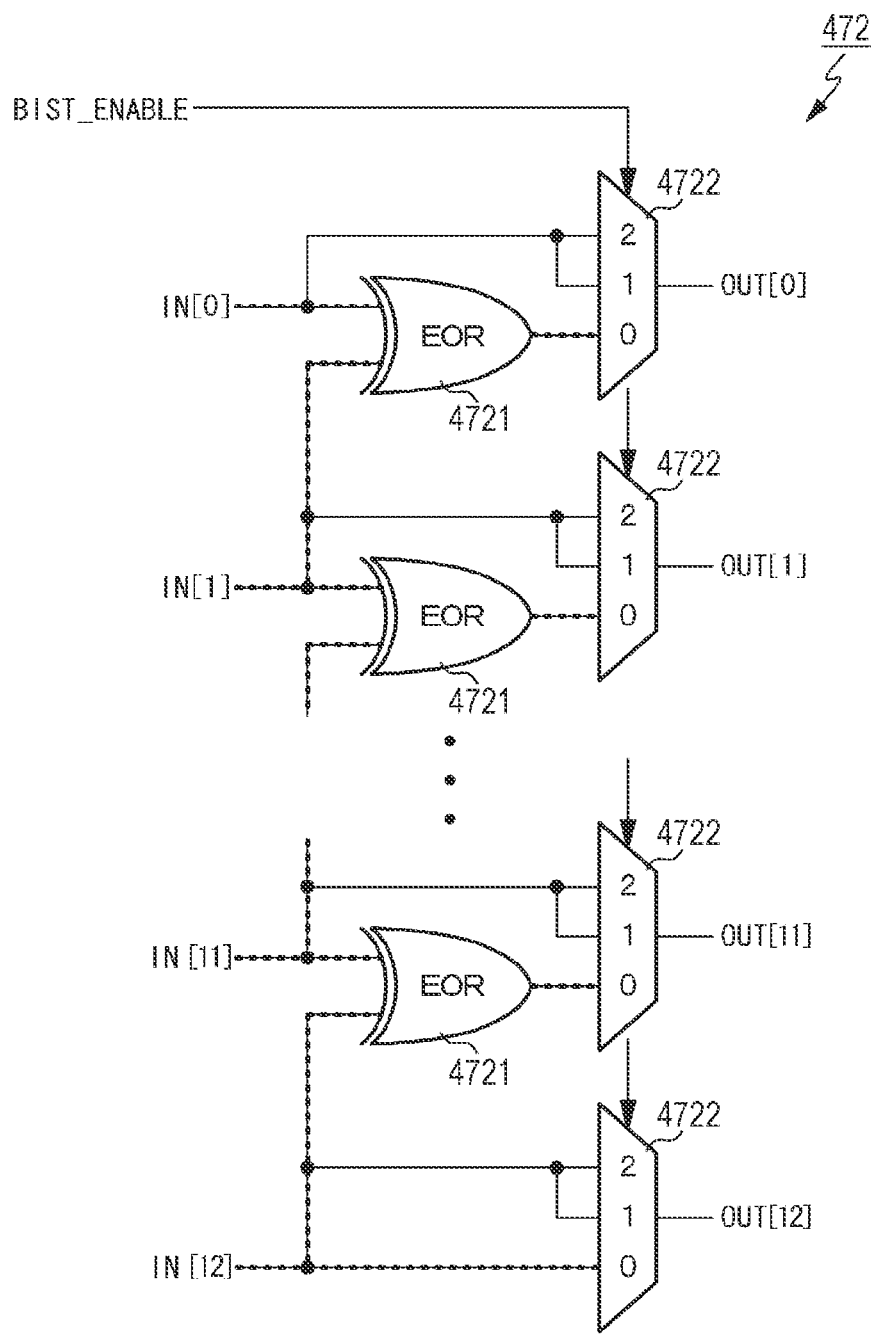
FIG. 12 is a diagram showing a signal path (dotted line) during a normal counting operation by the Gray code generator.
Figure 13:
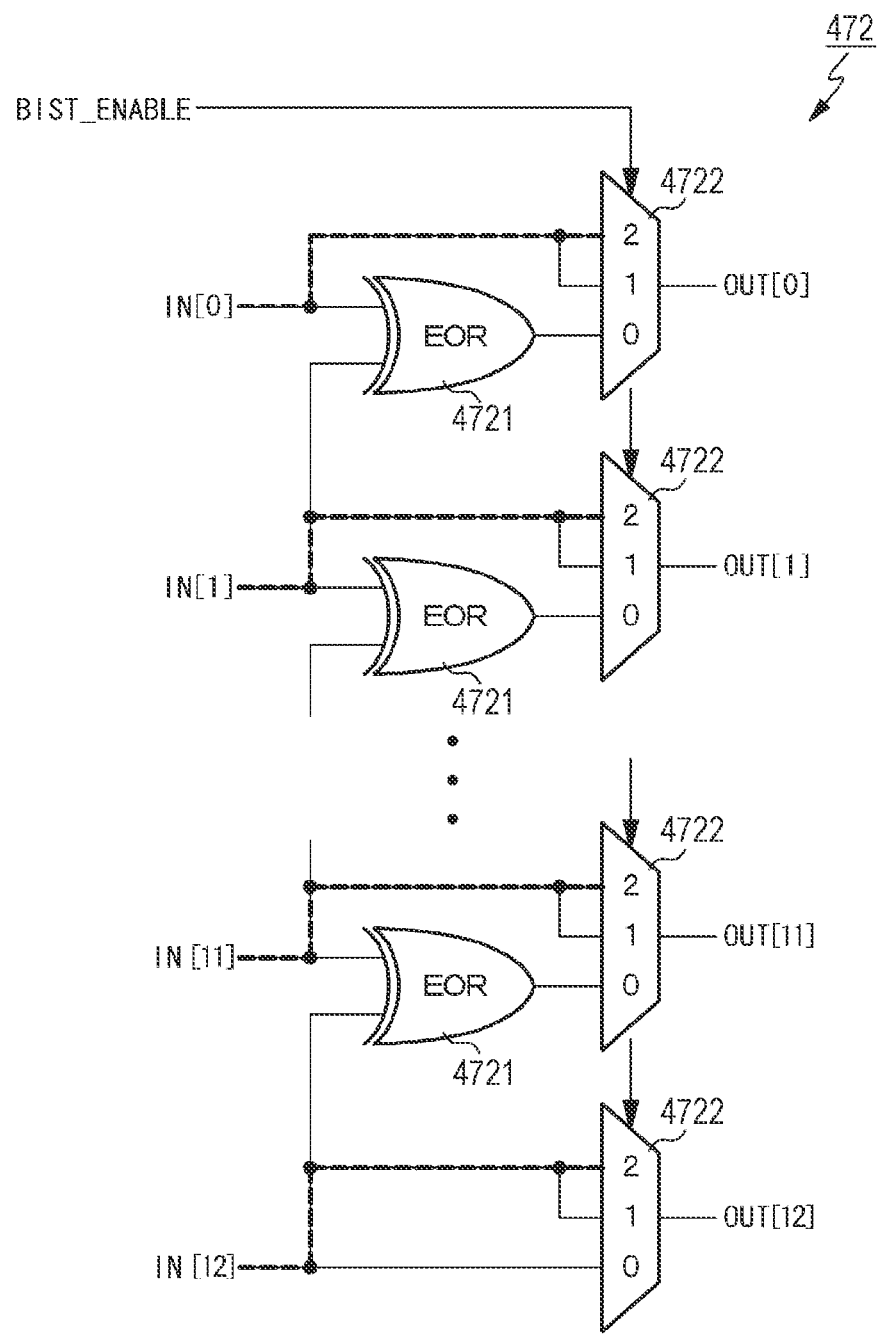
FIG. 13 is a diagram showing a signal path (broken line) during a failure detection (BIST) operation by the Gray code generator.

A signal path during the normal counting operation in the Gray code generator 472 having the above configuration is indicated by a dotted line in FIG. 12, and a signal path during the failure detection operation is indicated by a broken line in FIG. 13.

[Expected Value Comparison Unit]

Figure 14:
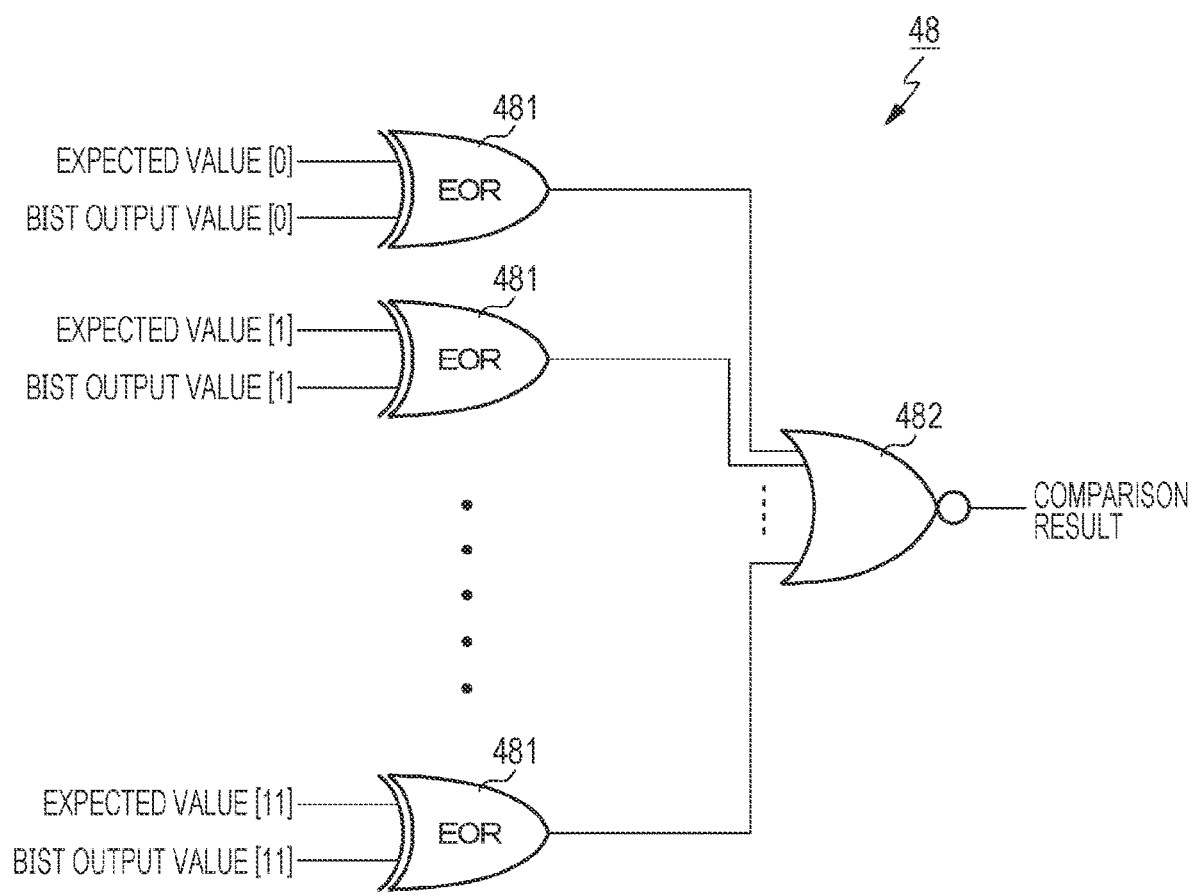
FIG. 14 is a block diagram showing a specific configuration example of an expected value comparison unit in the imaging device according to the embodiment of the present disclosure.

FIG. 14 shows a specific configuration example of the expected value comparison unit 48 in the imaging device according to the embodiment of the present disclosure.

The expected value comparison unit 48 has exclusive OR circuits (EORs) 481 which are provided corresponding to bits of the output value of the failure detection circuit, that is, the BIST output value, respectively, and a negative OR circuit 482 that uses the outputs of the exclusive OR circuits 481 as an input. The exclusive OR circuits 481 receive, for each bit, an expected value and a BIST output value as an input.

The expected value comparison unit 48 having the above configuration compares the BIST output value [11:0] of the failure detection circuit with the expected value [11:0], and outputs the comparison result as an assessment result of non-defective product/defective product based on the failure detection. Specifically, the expected value comparison unit 48 outputs a high-level comparison result when the BIST output values [11:0] of the failure detection circuit all agree with the expected values [11:0], while outputs a low-level comparison result even if there is only one bit that does not agree with the expected value.

[Alternating Pattern]

As a test pattern used for detecting failures such as disconnection and short circuit of wiring, an alternating pattern in which logic "1" and logic "0" are alternately arranged is preferable. The reason is as follows. As shown in FIG. 15A, if it is not an alternating pattern, it is not possible to detect a wiring short circuit due to dust or the like, but if it is an alternating pattern, it is possible to detect a wiring short circuit.

Further, it is preferable that the test pattern is a toggle pattern obtained by toggling the alternating pattern as shown in FIG. 15B. As shown in the timing waveform diagram of FIG. 10, the toggle pattern can be achieved by the toggle operation synchronized with the clock signal CLOCK of the binary counter 471. Due to failure detection using the toggle pattern obtained by toggling the alternating pattern as a test pattern, it is possible to particularly carry out comprehensive failure detection of a short circuit between adjacent wirings.

[Failure Detection Processing]

Figure 16:
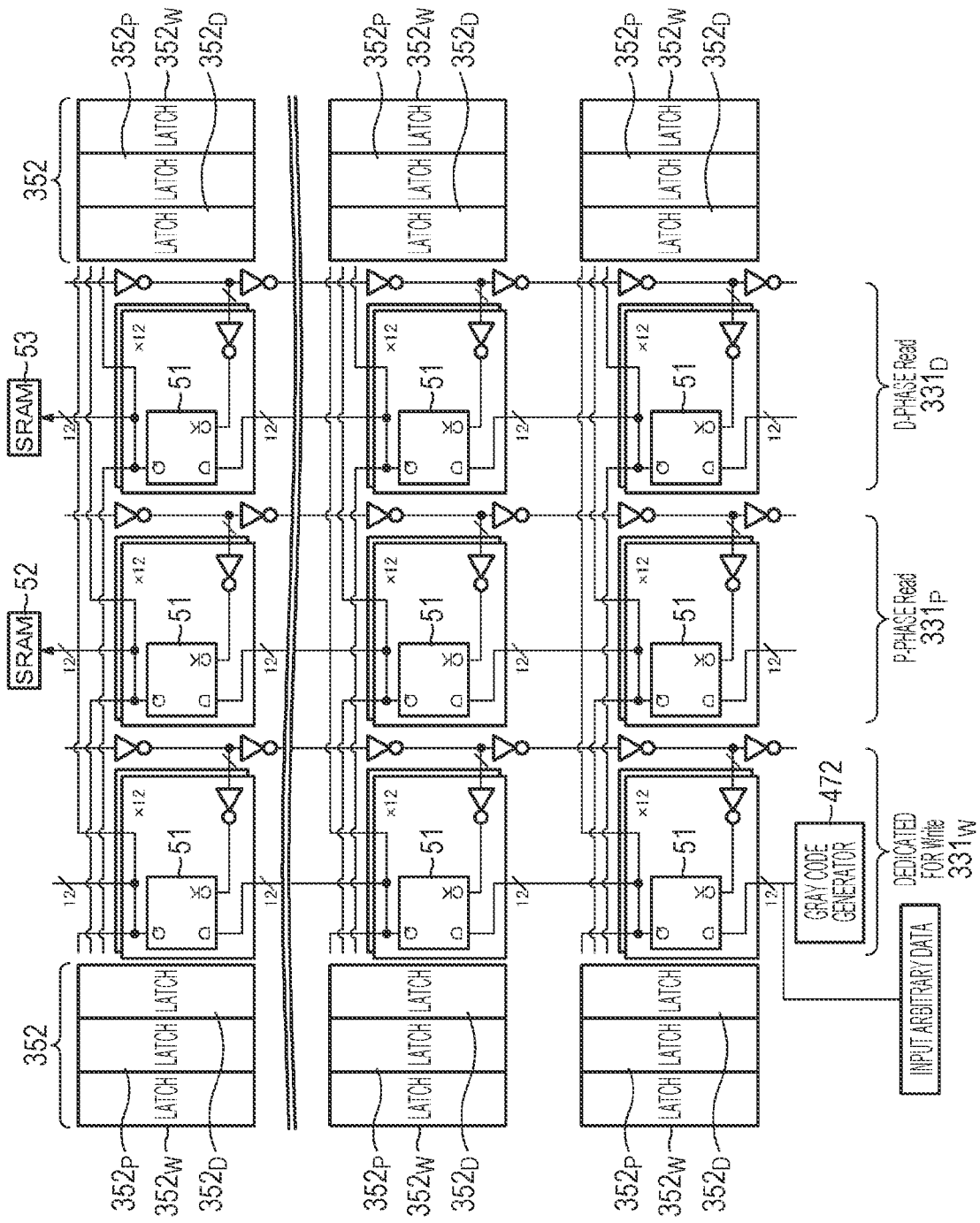
FIG. 16 is a block diagram showing a configuration example of a main part of a circuit which is a target for failure detection by a failure detection circuit.

Subsequently, specific examples of the failure detection processing by the failure detection circuit having the above configuration will be described. FIG. 16 shows a configuration example of a main part of the circuit which is a target of failure detection.

Example 1

Example 1 is a basic form of failure detection processing. The configuration example of Example 1 includes latch circuits $352_W$, $352_P$, and $352_D$ and transfer circuits $331_W$, $331_P$, and $331_D$ which are independent and which are dedicated for time code setting (Write), P-phase reading (Read), and D-phase reading (Read), respectively. Here, the latch circuits $352_W$, $352_P$, and $352_D$ correspond to the latch circuit 331 of the data storage unit 35 of the analog-to-digital conversion circuit 31, and the transfer circuits $331_W$, $331_P$, and $331_D$ are repeater circuits of the time code transfer unit 33. The same number of latch circuits and the same number of transfer circuits as the bit length of the test pattern are provided.

Note that, although Example 1 has circuit configurations which are independent and which are dedicated for time code setting, P-phase reading, and D-phase reading, respectively, a circuit configuration common to them may be used.

However, if independent circuit configurations are used, parallel processing can be performed, for example, in which P-phase data is written, and then, D-phase data is written while reading P-phase data. Therefore, from the viewpoint of high-speed processing, the case of using independent circuit configurations is more advantageous than the case of using a common circuit configuration in which parallel processing is impossible.

Figure 17:
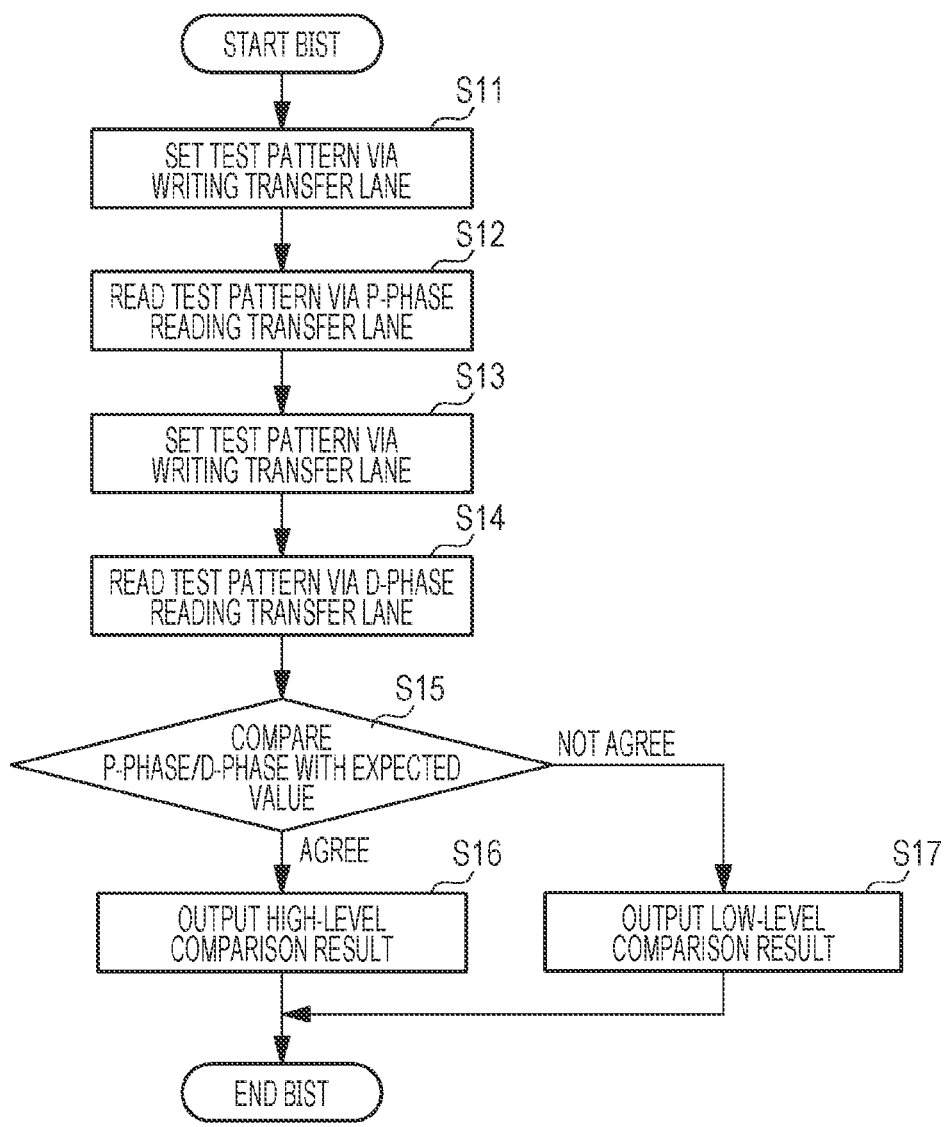
FIG. 17 is a flowchart showing an example of a procedure of failure detection processing according to Example 1.

FIG. 17 is a flowchart showing an example of the procedure of the failure detection processing according to Example 1. In the failure detection (BIST) processing described below, the transfer circuit $331_W$ for time code setting (Write) is referred to as a writing transfer lane, the transfer circuit $331_P$ for P-phase reading is referred to as a P-phase reading transfer lane, and the transfer circuit $331_D$ for D-phase reading is referred to as a D-phase reading transfer lane.

Figure 18:
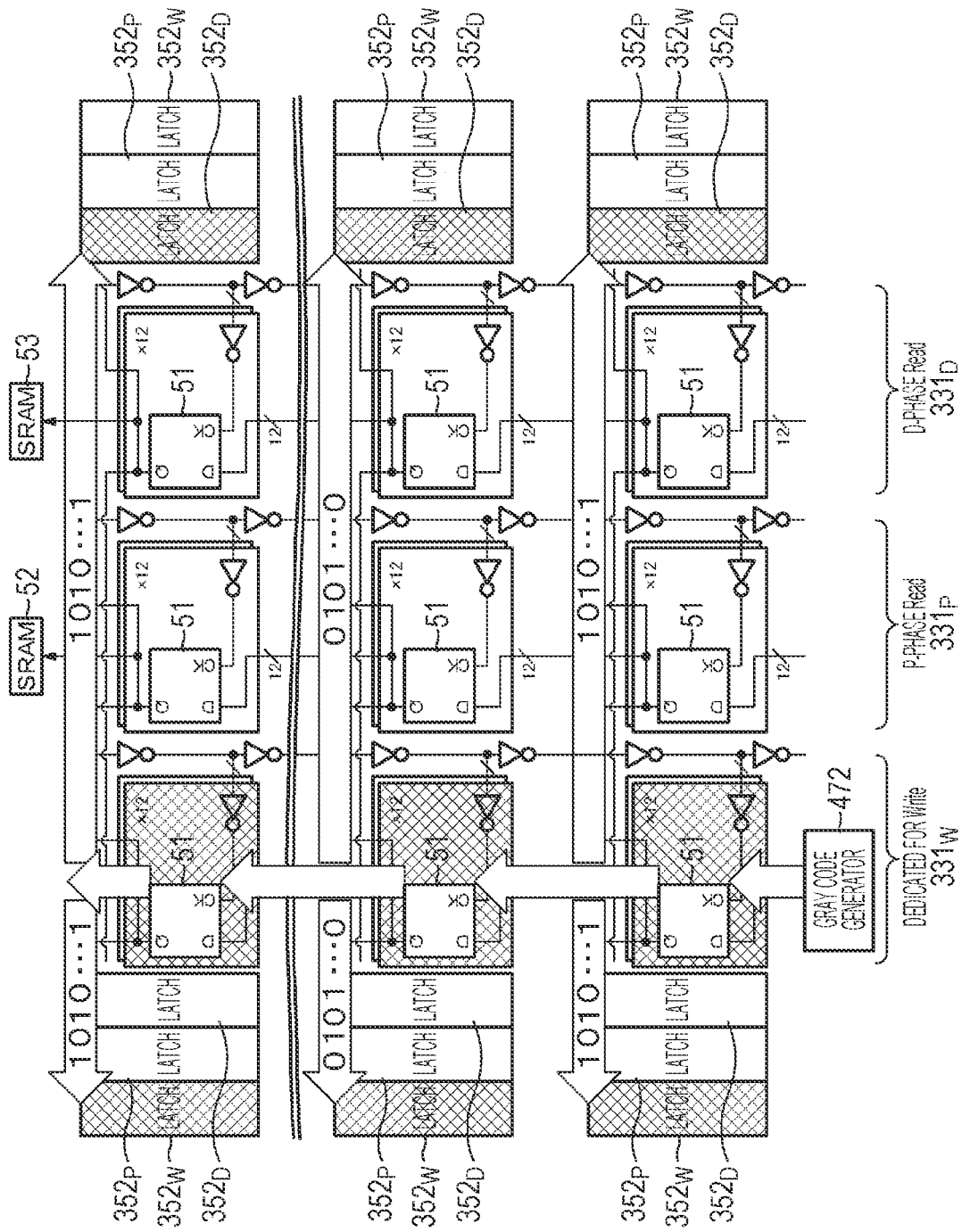
FIG. 18 is an explanatory diagram schematically showing a specific process of step S11 in the failure detection processing according to Example 1.

In the failure detection processing, first, a test pattern based on an arbitrary code output from the Gray code generator 472 is set in the latch circuit $352_W$ for writing via the writing transfer lane (step S11). By this process, it is possible to detect a failure of the writing transfer lane and the latch circuit $352_W$ for writing. FIG. 18 shows an explanatory diagram schematically illustrating a specific process of step S11 in the failure detection processing according to Example 1.

Figure 19:
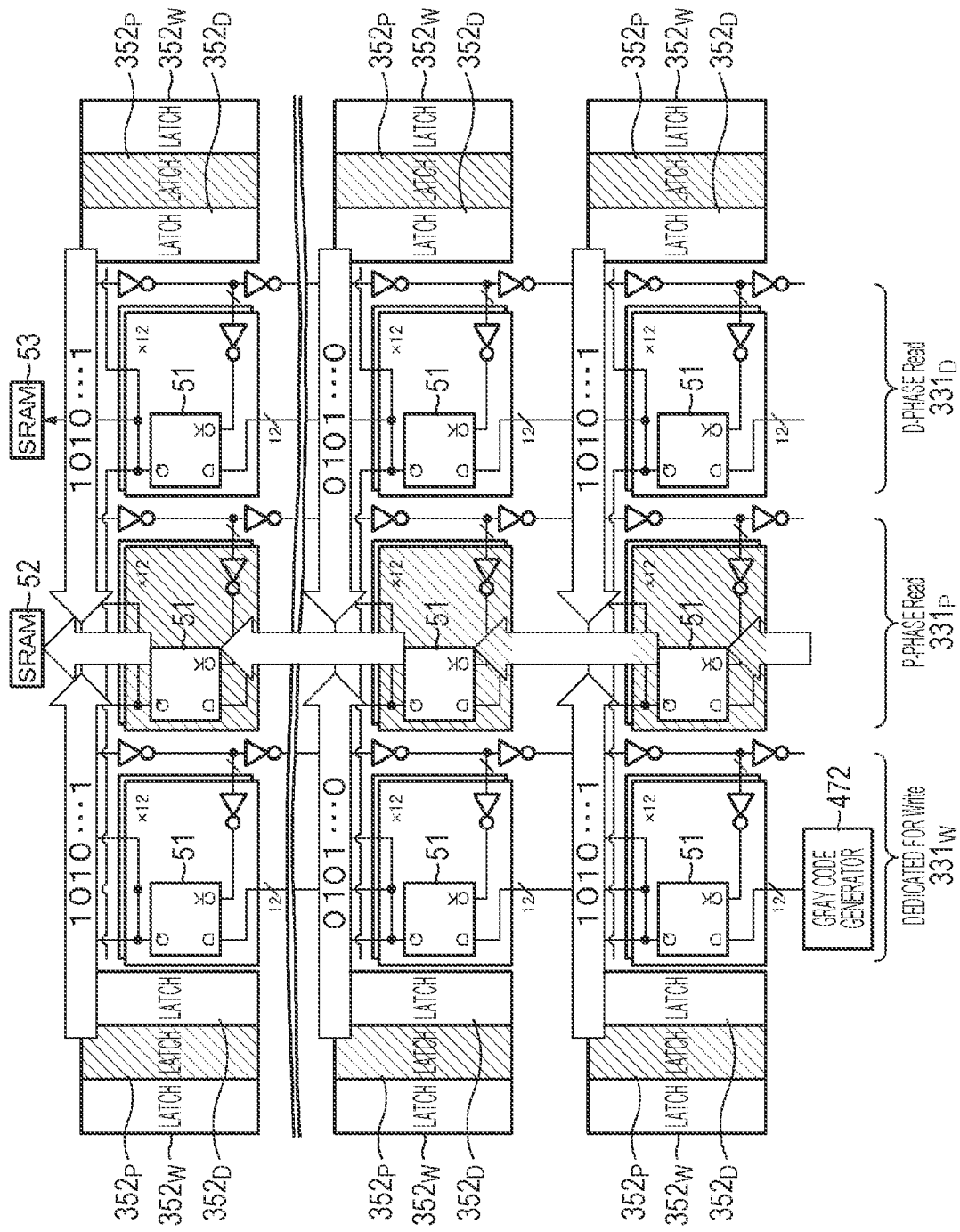
FIG. 19 is an explanatory diagram schematically showing a specific process of step S12 in the failure detection processing according to Example 1.

Next, the test pattern is read from the latch circuit $352_P$ for P-phase reading via the P-phase reading transfer lane and held in the SRAM 52 in the output unit 45 (see FIG. 2) (step S12). By this process, it is possible to detect the failure of the P-phase reading transfer lane and the latch circuit $352_P$ for P-phase reading. FIG. 19 shows an explanatory diagram schematically illustrating a specific process of step S12 in the failure detection processing according to Example 1.

Figure 20:
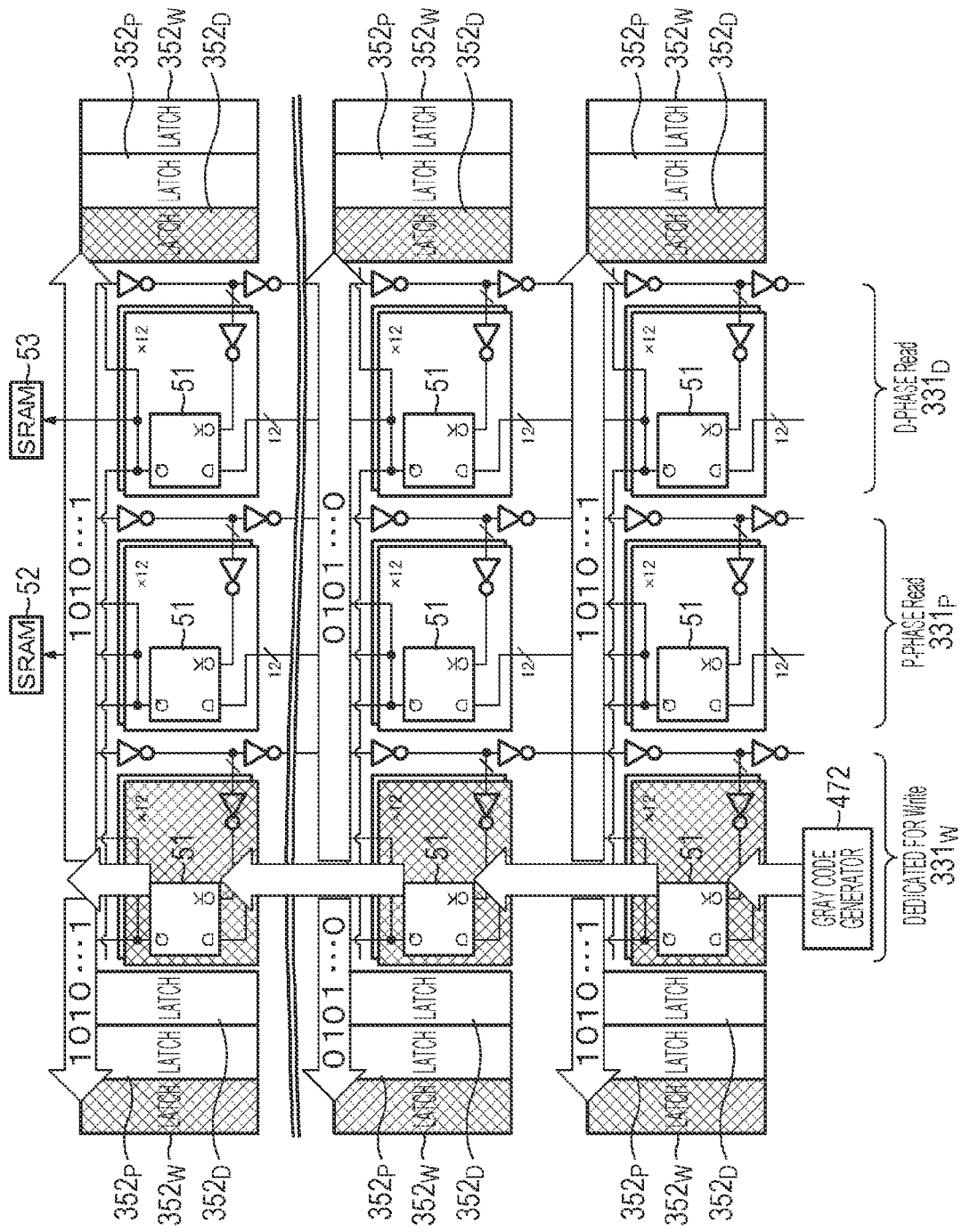
FIG. 20 is an explanatory diagram schematically showing a specific process of step S13 in the failure detection processing according to Example 1.

Next, the test pattern based on the arbitrary code is set in the latch circuit $352_W$ for writing via the writing transfer lane as in the process of step S11 (step S13). FIG. 20 shows an explanatory diagram schematically illustrating a specific process of step S13 in the failure detection processing according to Example 1.

Figure 21:
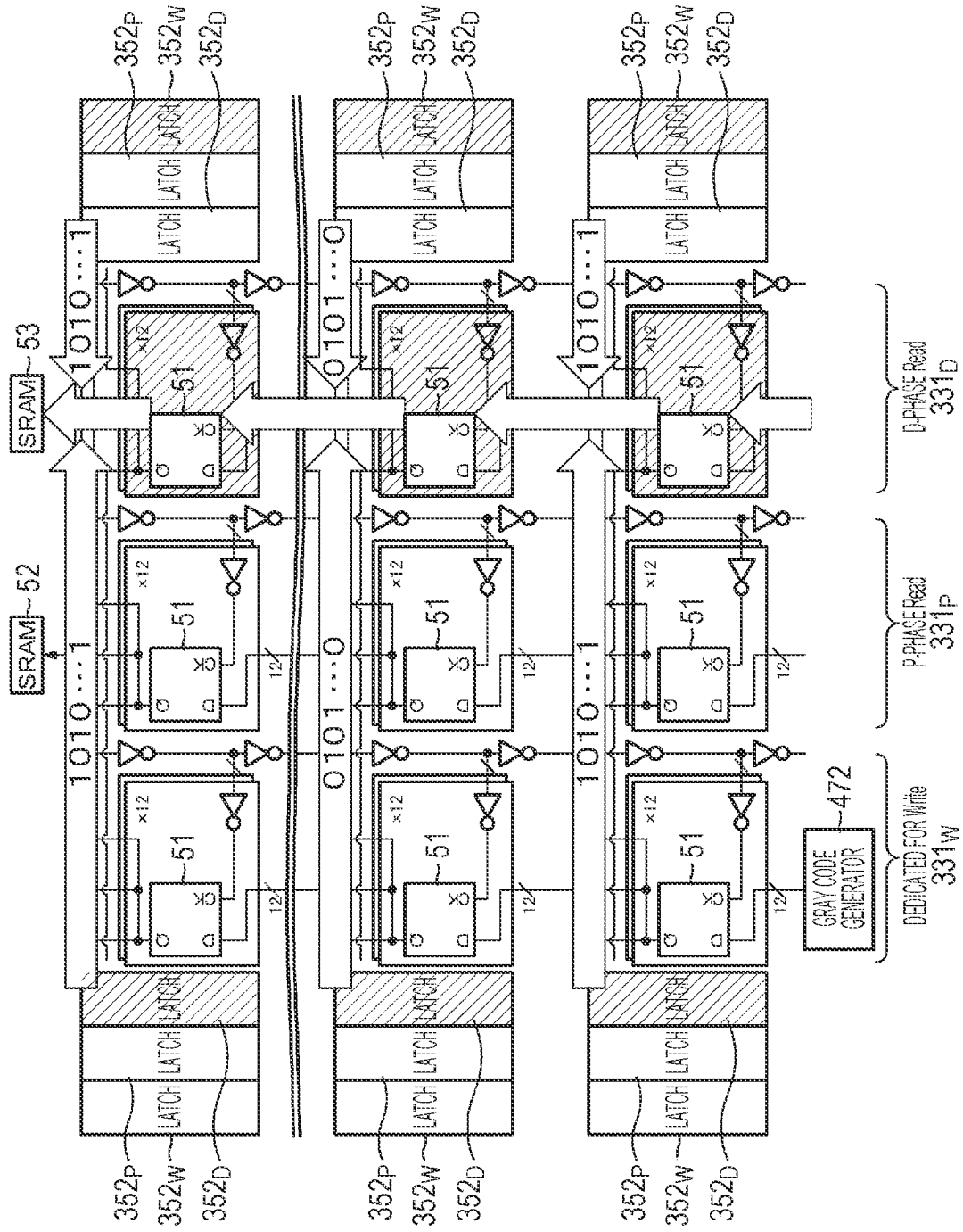
FIG. 21 is an explanatory diagram schematically showing a specific process of step S14 in the failure detection processing according to Example 1.

Next, the test pattern is read from the latch circuit $352_D$ for D-phase reading via the D-phase reading transfer lane and held in the SRAM 53 in the output unit 45 (see FIG. 2) (step S14). By this process, it is possible to detect the failure of the D-phase reading transfer lane and the latch circuit $352_P$ for D-phase reading. FIG. 21 shows an explanatory diagram schematically illustrating a specific process of step S14 in the failure detection processing according to Example 1.

Next, expected-value comparison is performed for assessing whether or not the data (test pattern) read via the P-phase reading transfer lane and held in the SRAM 52 and the data (test pattern) read via the D-phase reading transfer lane and held in the SRAM 53 agree with the expected values (step S15). Then, if the comparison result of the expected-value comparison indicates that they agree with each other, a high-level comparison result is output (step S16), and if the comparison result of the expected-value comparison indicates that they do not agree with each other, a low-level comparison result is output (step S17). Thereafter, a series of processes for failure detection is ended.

With the failure detection processing according to Example 1 described above, it is possible to comprehensively detect a failure of the latch circuits provided corresponding to the pixels and the circuits associated therewith. Specifically, Example 1 covers failure detection of the latch circuit $352_W$ for writing, the latch circuit $352_P$ for P-phase reading, the latch circuit $352_D$ for D-phase reading, the writing transfer lane (transfer circuit $331_W$), the P-phase reading transfer lane (transfer circuit $331_P$), and the D-phase reading transfer lane (transfer circuit $331_D$). Further, the failure detection processing in the present Example is not based on actual imaging, whereby the time to sort non-defective products/defective products during production can be shortened with this processing.

In addition, although the imaging device according to the present disclosure has a stacked chip structure, and the operation is not completed unless the pixel chip (first semiconductor chip 11) and the circuit chip (second semiconductor chip 12) are bonded together, the failure detection (BIST) can be completed only in the circuit chip, and thus, it is possible to sort out defective chips before bonding. Specifically, since failure detection can be performed only in the circuit wafer before the circuit wafer is bonded to the pixel wafer, only non-defective circuit chips in the circuit wafer can be transferred to the bonding step, for example. Thus, the yield can be improved, whereby the cost of the imaging device can be reduced. Further, according to the imaging device equipped with this failure detection circuit, it is possible to obtain a high-quality captured image without defects such as white spots and black spots.

Example 2

Figure 22:
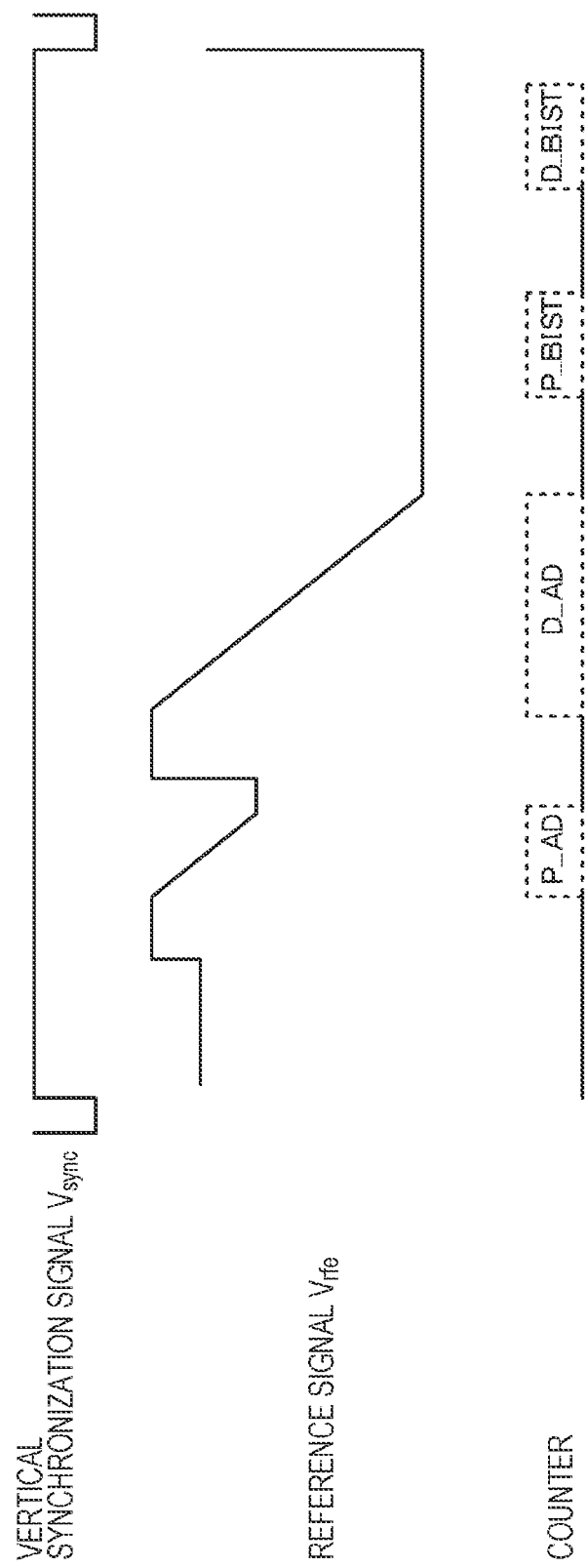
FIG. 22 is a timing waveform diagram showing failure detection processing according to Example 2.

Example 2 is a modification of Example 1, and is an example in which failure detection is performed during normal operation. FIG. 22 shows a timing waveform diagram illustrating failure detection processing according to Example 2.

As shown in the timing waveform diagram of FIG. 22, the comparison process of step S15 in the failure detection processing according to Example 1, that is, the process of comparing P-phase/D-phase with BIST expected value (P_BIST/D_BIST), is performed during a vertical blanking period during the normal operation. By performing failure detection during the normal operation in this way, it can be applied not only to detection of initial failure but also to detection of self-failure that is a failure occurring later. Specifically, when a failure occurs later, the imaging device itself can detect the failure and set a failure flag.

Example 3

Figure 23:
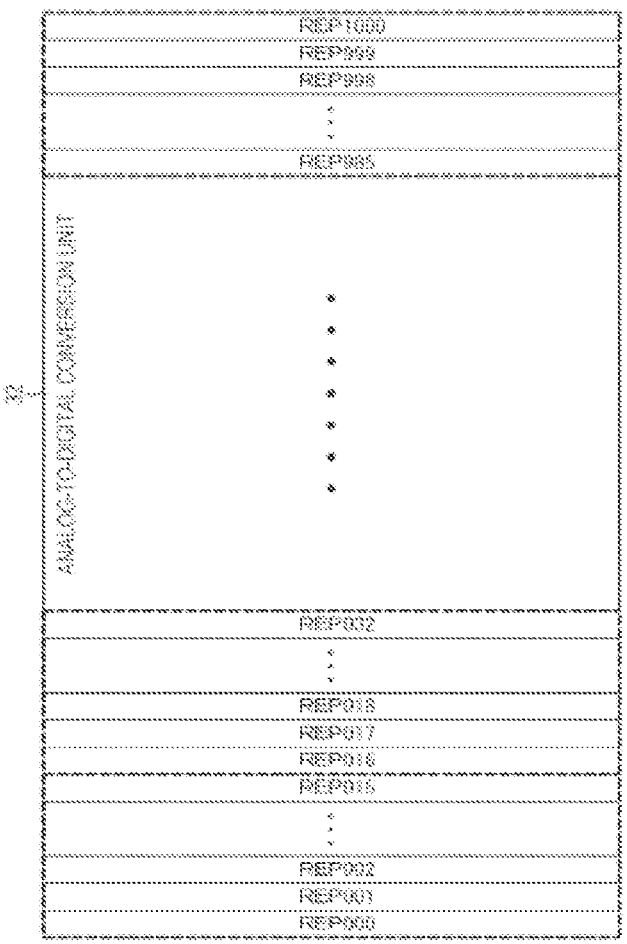
FIG. 23 is a conceptual diagram of an operation of failure detection processing according to Example 3.

Example 3 is a modification of Example 1 and is an example for avoiding malfunction due to excessive IR drop during failure detection (BIST). FIG. 23 shows a conceptual diagram of the operation of failure detection processing according to Example 3.

Failure detection (BIST) is performed on the repeater circuits (transfer circuits $331_W$, $331_P$, $331_D$ in FIG. 16) of the entire imaging device. With the failure detection processing according to Example 1, the alternating pattern is toggled as described above, so that all bits are always inverted, and if all bits are simultaneously inverted, power consumption increases, which will cause excessive IR drop. This may cause malfunction.

In view of this, in the failure detection processing according to Example 3, a predetermined number of, for example, 16 repeater circuits of the repeater circuits (REP000 to REP1000 in the example of FIG. 23) are grouped as one group, and the failure detection of the repeater circuits is performed partially for each group, not for all repeater circuits at a time. As a result, it is possible to suppress an increase in power consumption, whereby malfunction due to excessive IR drop during failure detection (BIST) can be avoided.

<Modifications>

While the technology according to the present disclosure has been described above on the basis of the preferred embodiment, the technology according to the present disclosure is not limited to the embodiment. The configuration and structure of the imaging device described in the above embodiment are merely illustrative, and can be changed as appropriate.

<Applications>

Figure 24:
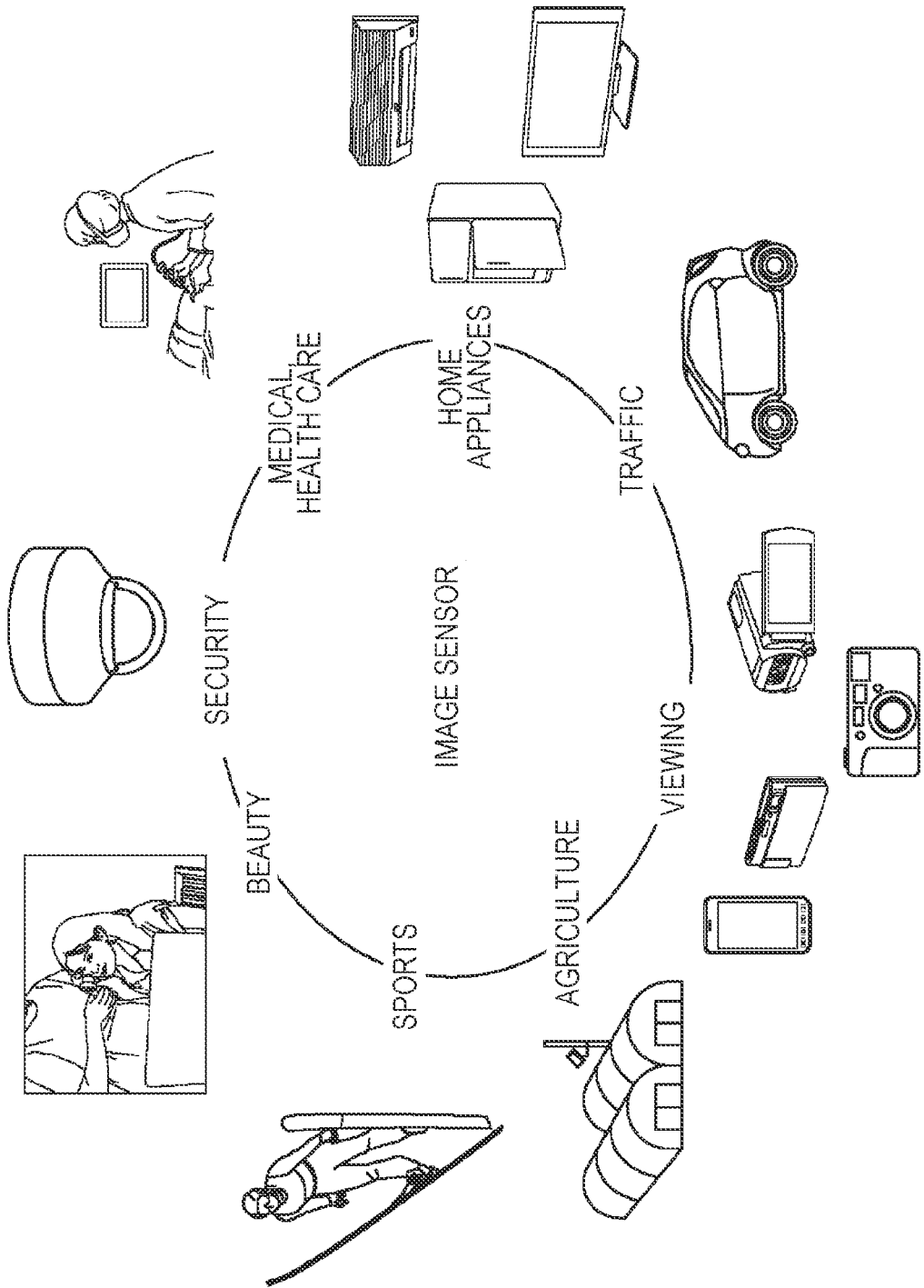
FIG. 24 is a diagram showing examples of application of the technology according to the present disclosure.

As shown in FIG. 24, for example, the imaging device according to the present embodiment described above can be used for various devices that sense light such as visible light, infrared light, ultraviolet light, and X-ray. Specific examples of various devices are listed below.

Devices that capture images used for viewing, such as digital cameras and mobile devices with camera functions Devices used for traffic for safe driving such as automatic stop, recognition of the condition of driver, etc., such as: in-vehicle sensors that capture an image of an environment in front of, at the rear of, and around automobile, the interior of the automobile, etc.; surveillance cameras that monitor traveling vehicles or road; or distance measurement sensors that measure the distance between vehicles, etc.

Devices used in home appliances such as TVs, refrigerators, and air conditioners to capture an image of gestures of users and perform operations according to the gestures Devices used for medical and healthcare, such as endoscopes and devices that perform angiography by receiving infrared light Devices used for security, such as surveillance cameras for crime prevention and cameras for personal authentication Devices used for beauty, such as skin measuring devices that capture an image of the skin and microscopes that capture the image of the scalp Devices used for sports such as action cameras and wearable cameras for sporting use, etc.

Devices used for agriculture, such as cameras for monitoring the condition of fields and crops <Examples of Application of Technology According to Present Disclosure>

The technology according to the present disclosure can be applied to various products. More specific examples of application will be described below.

[Electronic Apparatus According to Present Disclosure]

Here, a case where the present technology is applied to an electronic apparatus including: an imaging system such as a digital still camera or a video camera; a mobile terminal device having an imaging function such as a mobile phone; a copier using an imaging element in an image reading unit; etc. will be described.

(Example of Imaging System)

Figure 25:
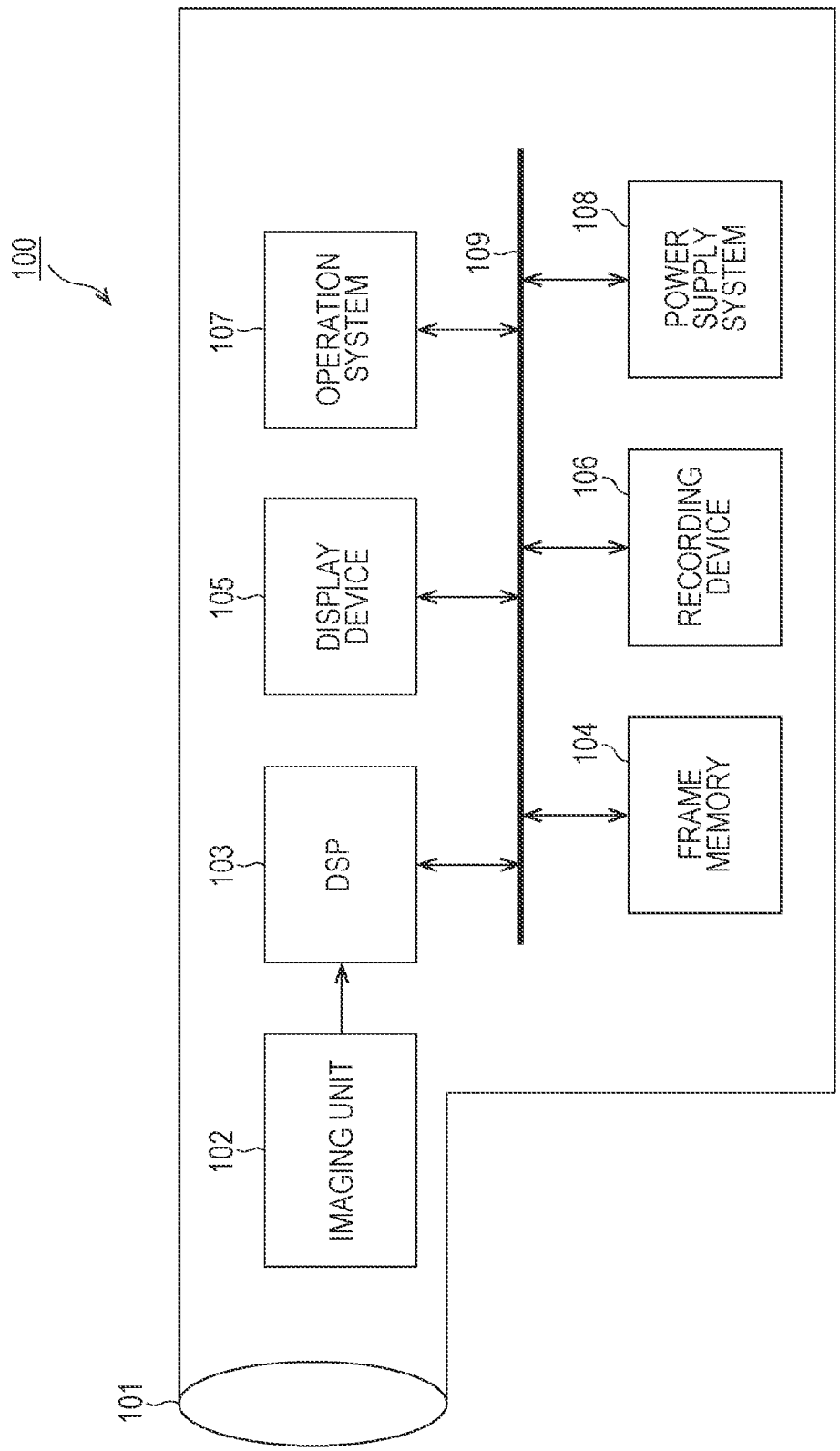
FIG. 25 is a block diagram schematically showing a configuration example of an imaging system that is an example of an electronic apparatus according to the present disclosure.

FIG. 25 is a block diagram illustrating a configuration example of an imaging system that is an example of an electronic apparatus according to the present disclosure.

As shown in FIG. 25, an imaging system 100 according to the present example includes an imaging optical system 101 including a lens group, etc., an imaging unit 102, a digital signal processor (DSP) circuit 103, a frame memory 104, a display device 105, a recording device 106, an operation system 107, a power supply system 108, etc. Then, in this configuration, the DSP circuit 103, the frame memory 104, the display device 105, the recording device 106, the operation system 107, and the power supply system 108 are interconnected via a bus line 109.

The imaging optical system 101 captures incident light (image light) from a subject and forms an image on an imaging surface of the imaging unit 102. The imaging unit 102 converts the amount of incident light formed into an image on the imaging surface by the optical system 101 into an electric signal on a pixel-by-pixel basis and outputs the electric signal as a pixel signal. The DSP circuit 103 performs general camera signal processing, for example, white balance processing, demosaic processing, gamma correction processing, and the like.

The frame memory 104 is appropriately used for storing data during signal processing in the DSP circuit 103. The display device 105 includes a panel-type display device such as a liquid crystal display device or an organic electro luminescence (EL) display device, and displays a moving image or a still image captured by the imaging unit 102. The recording device 106 records the moving image or still image captured by the imaging unit 102 on a recording medium such as a portable semiconductor memory, an optical disk, or a hard disk drive (HDD).

The operation system 107 issues operation commands for various functions of the imaging device 100 according to an operation performed by a user. The power supply system 108 appropriately supplies various power supplies, which are operation power supplies for the DSP circuit 103, the frame memory 104, the display device 105, the recording device 106, and the operation system 107, to these power supply targets.

In the imaging system 100 having the above configuration, the imaging device according to the abovementioned embodiment can be used as the imaging unit 102. According to the imaging device, the yield can be improved by failure detection (BIST) to which the technology according to the present disclosure is applied, which can contribute to the cost reduction of the imaging system 100. In addition, a high-quality captured image without defects such as white spots and black spots can be obtained.

[Application to Mobile Object]

The technology according to the present disclosure (present technology) can be applied to various products. For example, the technology according to the present disclosure may be implemented as an imaging device to be mounted on any type of mobile objects such as vehicles, electric vehicles, hybrid electric vehicles, motorcycles, bicycles, personal mobilities, airplanes, drones, ships, robots, construction machines, and agricultural machines (tractors).

Figure 26:
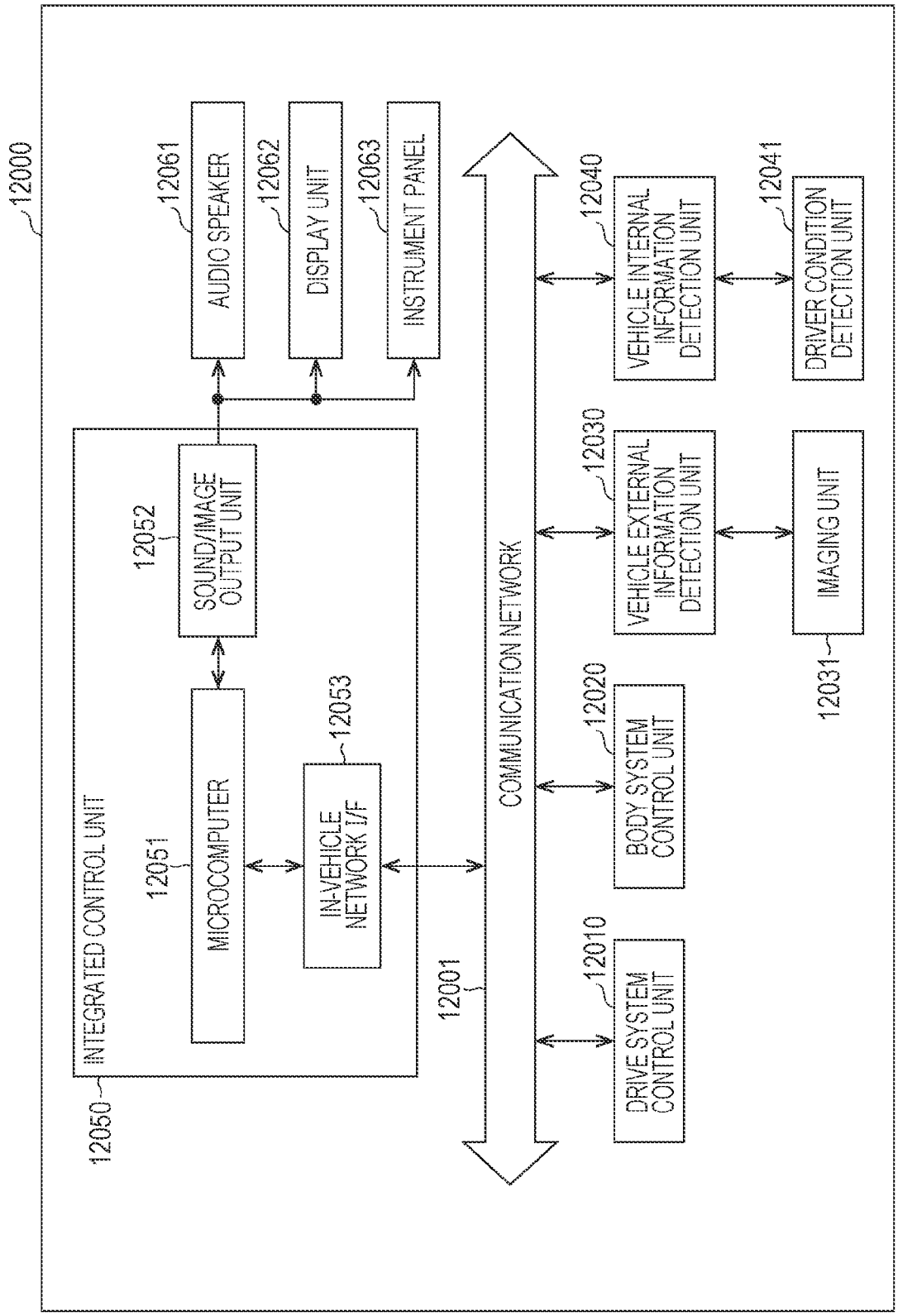
FIG. 26 is a block diagram showing a schematic configuration example of a vehicle control system which is an example of a mobile object control system to which the technology according to the present disclosure can be applied.

FIG. 26 is a block diagram showing a schematic configuration example of a vehicle control system which is an example of a mobile object control system to which the technology according to the present disclosure can be applied.

A vehicle control system 12000 includes a plurality of electronic control units connected to each other via a communication network 12001. In the example shown in FIG. 1021, the vehicle control system 12000 includes a drive system control unit 12010, a body system control unit 12020, a vehicle external information detection unit 12030, a vehicle internal information detection unit 12040, and an integrated control unit 12050. Further, as the functional configuration of the integrated control unit 12050, a microcomputer 12051, a sound/image output unit 12052, and an in-vehicle network interface (I/F) 12053 are illustrated.

The drive system control unit 12010 controls the operation of devices related to a drive system of a vehicle according to various programs. For example, the drive system control unit 12010 functions as a control device over a driving force generating device such as an internal combustion engine or a driving motor for generating a driving force of the vehicle, a driving force transmission mechanism for transmitting the driving force to wheels, a steering mechanism adjusting a steering angle of the vehicle, a braking device that generates a braking force of the vehicle, and the like.

The body system control unit 12020 controls operations of various devices mounted on the vehicle body according to various programs. For example, the body system control unit 12020 functions as a keyless entry system, a smart key system, a power window device, or a control device for various lamps such as a headlamp, a backup lamp, a brake lamp, a blinker, or a fog lamp. In this case, the body system control unit 12020 can receive radio waves transmitted from a portable device that can be used as a key or signals from various switches. The body system control unit 12020 receives input of these radio waves or signals, and controls a door lock device, power window device, lamps, and the like of the vehicle.

The vehicle external information detection unit 12030 detects information regarding the outside of the vehicle equipped with the vehicle control system 12000. For example, the vehicle external information detection unit 12030 is connected with an imaging unit 12031. The vehicle external information detection unit 12030 causes the imaging unit 12031 to capture an image outside the vehicle, and receives the captured image. The vehicle external information detection unit 12030 may perform, on the basis of the received image, a process of detecting an object such as a person, a vehicle, an obstacle, a road sign, or a character on a road surface, or a process of detecting the distance thereto.

The imaging unit 12031 is an optical sensor that receives light and outputs an electric signal corresponding to the amount of received light. The imaging unit 12031 can output an electric signal as an image or as information for distance measurement. Further, the light received by the imaging unit 12031 may be visible light or invisible light such as infrared rays.

The vehicle internal information detection unit 12040 detects information regarding the inside of the vehicle. For example, the vehicle internal information detection unit 12040 is connected with a driver condition detection unit 12041 that detects the condition of a driver. The driver condition detection unit 12041 may include, for example, a camera that captures an image of the driver. On the basis of detection information input from the driver condition detection unit 12041, the vehicle internal information detection unit 12040 may calculate a degree of fatigue of the driver or a degree of concentration of the driver, or may determine whether or not the driver is dozing.

The microcomputer 12051 can calculate a control target value for the driving force generating device, the steering mechanism, or the braking device on the basis of the information about the inside and outside of the vehicle obtained by the vehicle external information detection unit 12030 or the vehicle internal information detection unit 12040, and output a control command to the drive system control unit 12010. For example, the microcomputer 12051 may perform cooperative control intended to implement functions of an advanced driver assistance system (ADAS) which include collision avoidance or shock mitigation for the vehicle, following driving based on distance between vehicles, vehicle speed maintaining driving, a warning of collision of the vehicle, a warning of lane departure of the vehicle, or the like.

In addition, the microcomputer 12051 may perform cooperative control intended for automatic driving, which makes the vehicle travel autonomously without the need of the operation of the driver, or the like, by controlling the driving force generating device, the steering mechanism, the braking device, or the like on the basis of the information about the surrounding situation of the vehicle obtained by the vehicle external information detection unit 12030 or the vehicle internal information detection unit 12040.

Further, the microcomputer 12051 can output a control command to the body system control unit 12020 on the basis of information about the outside of the vehicle acquired by the vehicle external information detection unit 12030. For example, the microcomputer 12051 may perform cooperative control including controlling the head lamps on the basis of the location of a preceding vehicle or an oncoming vehicle detected by the vehicle external information detection unit 12030 and changing high beams to low beams, for example, for the purpose of anti-glare.

The sound/image output unit 12052 transmits an output signal of at least one of a sound or an image to an output device capable of visually or auditorily giving information to an occupant of the vehicle or the outside of the vehicle. In the example of FIG. 26, an audio speaker 12061, a display unit 12062, and an instrument panel 12063 are illustrated as the output device. The display unit 12062 may include, for example, at least one of an on-board display or a head-up display.

Figure 27:
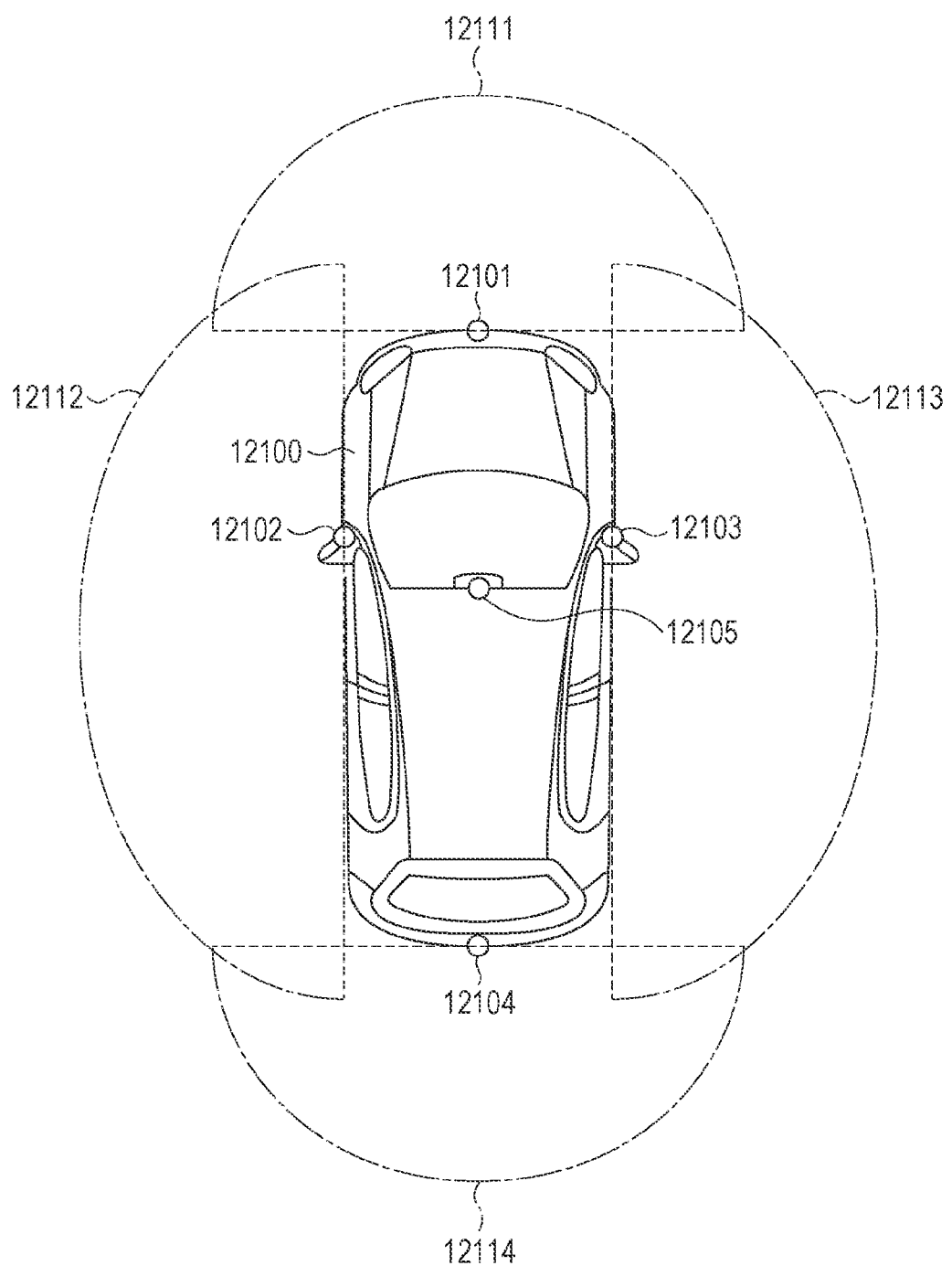
FIG. 27 is a diagram showing an example of mounting positions of imaging units in the mobile object control system.

FIG. 27 is a diagram showing examples of mounting positions of the imaging units 12031.

In FIG. 27, a vehicle 12100 includes, as the imaging units 12031, imaging units 12101, 12102, 12103, 12104, and 12105.

For example, the imaging units 12101, 12102, 12103, 12104, and 12105 are provided at positions such as the front nose, the side-view mirrors, the rear bumper or the back door, and an upper part of the windshield in the cabin of the vehicle 12100. The imaging unit 12101 provided on the front nose and the imaging unit 12105 provided at the upper part of the windshield in the cabin of the vehicle mainly acquire an image of an environment in front of the vehicle 12100. The imaging units 12102 and 12103 on the side-view mirrors mainly obtain an image of an environment on the side of the vehicle 12100. The imaging unit 12104 provided in the rear bumper or the back door mainly obtains an image of an environment behind the vehicle 12100. The images of the environment in front of the vehicle obtained by the imaging units 12101 and 12105 are mainly used for detecting a preceding vehicle, a pedestrian, an obstacle, a traffic light, a traffic sign, a lane, or the like.

Note that FIG. 27 shows examples of image capture ranges of the imaging units 12101 to 12104. The image capture range 12111 indicates the image capture range of the imaging unit 12101 on the front nose, the image capture ranges 12112 and 12113 indicate the image capture ranges of the imaging units 12102 and 12103 on the side-view mirrors, respectively, and the image capture range 12114 indicates the image capture range of the imaging unit 12104 on the rear bumper or the back door. For example, a bird's-eye image of the vehicle 12100 as viewed from above can be obtained by superimposing image data captured by the imaging units 12101 to 12104.

At least one of the imaging units 12101 to 12104 may have a function of obtaining distance information. For example, at least one of the imaging units 12101 to 12104 may be a stereo camera including a plurality of imaging elements or an imaging element including pixels for phase difference detection.

For example, the microcomputer 12051 obtains the distance between the vehicle 12100 and each three-dimensional object in the image capture ranges 12111 to 12114 and the temporal change (relative speed to the vehicle 12100) of the distance on the basis of the distance information obtained from the imaging units 12101 to 12104, and may extract, as a preceding vehicle, especially a three-dimensional object which is the closest to the vehicle 12100 on the path on which the vehicle 12100 is traveling and which is traveling at a predetermined speed (e.g., 0 km/h or more) in the direction substantially the same as the traveling direction of the vehicle 12100. Further, the microcomputer 12051 may perform autobrake control (including follow-up stop control), automatic acceleration control (including follow-up start-driving control), and the like by presetting a distance to be maintained between the vehicle 12100 and a preceding vehicle. In this way, it is possible to perform cooperative control intended to achieve autonomous driving without the need of drivers' operations, and the like.

For example, the microcomputer 12051 may sort three-dimensional object data of three-dimensional objects into motorcycles, standard-size vehicles, large-size vehicles, pedestrians, and the other three-dimensional objects such as utility poles on the basis of the distance information obtained from the imaging units 12101 to 12104, extract data, and use the data to automatically avoid obstacles. For example, the microcomputer 12051 sorts obstacles around the vehicle 12100 into obstacles that a driver of the vehicle 12100 can see and obstacles that it is difficult for the driver to see. Then, the microcomputer 12051 determines a collision risk, which indicates a hazard level of a collision with each obstacle. When the collision risk is equal to or higher than a preset value and thus there is a possibility of collision, the microcomputer 12051 may perform driving assistance to avoid a collision by outputting a warning to the driver via the audio speaker 12061 or the display unit 12062, or by forcibly reducing the speed or performing collision-avoidance steering via the drive system control unit 12010.

At least one of the imaging units 12101 to 12104 may be an infrared camera that detects infrared light. For example, the microcomputer 12051 may recognize a pedestrian by determining whether or not images captured by the imaging units 12101 to 12104 include the pedestrian. The method of recognizing a pedestrian includes, for example, a step of extracting feature points in the images captured by the imaging units 12101 to 12104 being infrared cameras, and a step of performing a pattern matching process with respect to a series of feature points indicating an outline of an object, to thereby determine whether or not the object is a pedestrian. When the microcomputer 12051 determines that the images captured by the imaging units 12101 to 12104 include a pedestrian and recognizes the pedestrian, the sound/image output unit 12052 controls the display unit 12062 such that a rectangular contour is displayed overlaid on the recognized pedestrian to emphasize the pedestrian. Further, the sound/image output unit 12052 may control the display unit 12062 such that an icon or the like indicating a pedestrian is displayed at a desired position.

An example of the vehicle control system to which the technology according to the present disclosure can be applied has been described above. The technology according to the present disclosure can be applied to, for example, the imaging unit 12031 and the like in the configuration described above. Then, by applying the technology according to the present disclosure to the imaging unit 12031 or the like, the yield can be improved by failure detection (BIST), so that an inexpensive vehicle control system can be constructed. In addition, a high-quality captured image without defects such as white spots and black spots can be obtained.

<Possible Configuration of Present Disclosure>

It is to be noted that the technology of the present disclosure may have the following configurations.

<<A. Imaging Device>>

[A-1] An imaging device having a stacked chip structure in which at least two semiconductor chips which are a first semiconductor chip and a second semiconductor chip are stacked, the first semiconductor chip being provided with a pixel circuit that includes a photoelectric conversion element, the second semiconductor chip including an analog-to-digital conversion circuit provided so as to correspond to the pixel circuit, the analog-to-digital conversion circuit including a latch circuit that retains a digital code after analog-to-digital conversion and a transfer circuit that transfers the digital code after analog-to-digital conversion, the imaging device comprising a failure detection circuit that performs failure detection of the analog-to-digital conversion circuit, in which the failure detection circuit performs failure detection by writing a test pattern for failure detection to the latch circuit via the transfer circuit, then reading the test pattern from the latch circuit via the transfer circuit, and comparing the read test pattern with an expected value.

[A-2] The imaging device according to [A-1] described above, in which the test pattern is an alternating pattern in which logic "1" and logic "0" are arranged alternately.

[A-3] The imaging device according to [A-2] described above, in which the test pattern is a toggle pattern in which the logic of the alternating pattern is inverted in synchronization with a clock signal for generating the test pattern.

[A-4] The imaging device according to any one of [A-1] to [A-3] described above, in which, when data obtained by performing analog-to-digital conversion on a signal level output from the pixel circuit is defined as D-phase data, and digital data obtained by performing analog-to-digital conversion on a reset level is defined as P-phase data, the analog-to-digital conversion circuit has:

a latch circuit for test-pattern writing, a latch circuit for P-phase reading, and a latch circuit for D-phase reading as the latch circuit; and a transfer circuit for test-pattern writing, a transfer circuit for P-phase reading, and a transfer circuit for D-phase reading as the transfer circuit.

[A-5] The imaging device according to [A-4] described above, in which the failure detection circuit:

writes the test pattern to the latch circuit for test-pattern writing via the transfer circuit for test-pattern writing;

then, reads the test pattern from the latch circuit for P-phase reading via the transfer circuit for P-phase reading;

then, writes again the test pattern to the latch circuit for test-pattern writing via the transfer circuit for test-pattern writing; and then, reads the test pattern from the latch circuit for D-phase reading via the transfer circuit for D-phase reading.

[A-6] The imaging device according to [A-5] described above,
in which the failure detection circuit performs expected-value comparison for assessing whether or not the test pattern read from the latch circuit for P-phase reading via the transfer circuit for P-phase reading and the test pattern read from the latch circuit for D-phase reading via the transfer circuit for D-phase reading agree with an expected value.

[A-7] The imaging device according to [A-6] described above,
in which the failure detection circuit performs processing of the expected-value comparison within a vertical blanking period.

[A-8] The imaging device according to any one of [A-1] to [A-7] described above,
in which, when the transfer circuit is divided into groups in a unit of a predetermined number,
the failure detection circuit partially performs failure detection for each of the groups when executing failure detection of the transfer circuit.

<<B. Electronic Apparatus>>

[B-1] An electronic apparatus comprising an imaging device having a stacked chip structure in which at least two semiconductor chips which are a first semiconductor chip and a second semiconductor chip are stacked, the first semiconductor chip being provided with a pixel circuit that includes a photoelectric conversion element, the second semiconductor chip including an analog-to-digital conversion circuit provided so as to correspond to the pixel circuit,
the analog-to-digital conversion circuit including a latch circuit that retains a digital code after analog-to-digital conversion and a transfer circuit that transfers the digital code after analog-to-digital conversion,
the imaging device including a failure detection circuit that performs failure detection of the analog-to-digital conversion circuit,
in which the failure detection circuit performs failure detection by writing a test pattern for failure detection to the latch circuit via the transfer circuit, then reading the test pattern from the latch circuit via the transfer circuit, and comparing the read test pattern with an expected value.

[B-2] The electronic apparatus according to [B-1] described above,
in which the test pattern is an alternating pattern in which logic "1" and logic "0" are arranged alternately.

[B-3] The electronic apparatus according to [B-2] described above,
in which the test pattern is a toggle pattern in which the logic of the alternating pattern is inverted in synchronization with a clock signal for generating the test pattern.

[B-4] The electronic apparatus according to any one of [B-1] to [B-3] described above,
in which, when data obtained by performing analog-to-digital conversion on a signal level output from the pixel circuit is defined as D-phase data, and digital data obtained by performing analog-to-digital conversion on a reset level is defined as P-phase data, the analog-to-digital conversion circuit has:
a latch circuit for test-pattern writing, a latch circuit for P-phase reading, and a latch circuit for D-phase reading as the latch circuit; and
a transfer circuit for test-pattern writing, a transfer circuit for P-phase reading, and a transfer circuit for D-phase reading as the transfer circuit.

[B-5] The electronic apparatus according to [B-4] described above,
in which the failure detection circuit:
writes the test pattern to the latch circuit for test-pattern writing via the transfer circuit for test-pattern writing;
then, reads the test pattern from the latch circuit for P-phase reading via the transfer circuit for P-phase reading;
then, writes again the test pattern to the latch circuit for test-pattern writing via the transfer circuit for test-pattern writing; and then,
reads the test pattern from the latch circuit for D-phase reading via the transfer circuit for D-phase reading.

[B-6] The electronic apparatus according to [B-5] described above,
in which the failure detection circuit performs expected-value comparison for assessing whether or not the test pattern read from the latch circuit for P-phase reading via the transfer circuit for P-phase reading and the test pattern read from the latch circuit for D-phase reading via the transfer circuit for D-phase reading agree with an expected value.

[B-7] The electronic apparatus according to [B-6] described above,
in which the failure detection circuit performs processing of the expected-value comparison within a vertical blanking period.

[B-8] The electronic apparatus according to any one of [B-1] to [B-7] described above,
in which, when the transfer circuit is divided into groups in a unit of a predetermined number,
the failure detection circuit partially performs failure detection for each of the groups when executing failure detection of the transfer circuit.

REFERENCE SIGNS LIST

11 First semiconductor chip (pixel chip)
12 Second semiconductor chip (circuit chip)
21 Pixel circuit
22 Pixel array unit
31 Analog-to-digital conversion circuit
32 Analog-to-digital conversion unit
33 Time code transfer unit
34 Comparison circuit
35 Data storage unit
41 Pixel driving unit
42 Reference signal generation unit
43 Time code generation unit
44 Vertical driving unit
45 Output unit
46 Timing generation unit
47 Test pattern generation unit
48 Expected value comparison unit
$331_W$ Transfer circuit for time code setting (writing transfer lane)
$331_P$ Transfer circuit for P-phase reading (P-phase reading transfer lane)
$331_D$ Transfer circuit for D-phase reading (D-phase reading lane)
351 Latch circuit control unit
352 Latch circuit
$352_W$ Latch circuit for writing
$352_P$ Latch circuit for P-phase reading
$352_D$ Latch circuit for D-phase reading

The invention claimed is:
1. An imaging device, comprising:
a stacked chip structure that includes at least two semiconductor chips, wherein
the at least two semiconductor chips include a first semiconductor chip and a second semiconductor chip,
the first semiconductor chip includes a pixel circuit, the pixel circuit includes a photoelectric conversion element,
the second semiconductor chip includes an analog-to-digital conversion circuit corresponding to the pixel circuit,
the analog-to-digital conversion circuit configured to execute analog-to-digital conversion on a specific signal, and
the analog-to-digital conversion circuit includes:
  a latch circuit configured to retain a digital code after the analog-to-digital conversion; and
  a transfer circuit configured to transfer the digital code after the analog-to-digital conversion; and
a failure detection circuit configured to:
  write, via the transfer circuit, a test pattern for failure detection to the latch circuit, wherein
    the test pattern is a toggle pattern in which logic of an alternating pattern is inverted in synchronization with a clock signal,
    the clock signal is for generation of the test pattern, and
    the alternating pattern is a pattern in which logic "1" and logic "0" have an alternate arrangement;
  read, via the transfer circuit, the test pattern from the latch circuit;
  compare the read test pattern with a specific value; and
detect failure of the analog-to-digital conversion circuit based on a result of the comparison.

2. The imaging device according to claim 1, wherein
the pixel circuit is configured to output a signal level and a reset level,
the analog-to-digital conversion circuit is further configured to:
  execute analog-to-digital conversion on the signal level to obtain D-phase data; and
  execute analog-to-digital conversion on the reset level to obtain P-phase data,
the latch circuit includes a latch circuit for test-pattern writing, a latch circuit for P-phase reading, and a latch circuit for D-phase reading, and
the transfer circuit includes a transfer circuit for test-pattern writing, a transfer circuit for P-phase reading, and a transfer circuit for D-phase reading.

3. The imaging device according to claim 2, wherein the failure detection circuit is further configured to:
write the test pattern to the latch circuit for test-pattern writing via the transfer circuit for test-pattern writing;
read the test pattern from the latch circuit for P-phase reading via the transfer circuit for P-phase reading;
write, after the test pattern is read from the latch circuit for P-phase reading, the test pattern to the latch circuit for test-pattern writing via the transfer circuit for test-pattern writing; and
read the test pattern from the latch circuit for D-phase reading via the transfer circuit for D-phase reading.

4. The imaging device according to claim 3,
wherein the failure detection circuit is further configured to execute expected-value comparison to assess whether the test pattern read from the latch circuit for P-phase reading via the transfer circuit for P-phase reading and the test pattern read from the latch circuit for D-phase reading via the transfer circuit for D-phase reading agree with the specific value.

5. The imaging device according to claim 4, wherein the failure detection circuit is further configured to execute the expected-value comparison within a vertical blanking period.

6. The imaging device according to claim 1, wherein
the transfer circuit is divided into a plurality of groups in a unit of a determined number,
the failure detection circuit is further configured to:
  execute failure detection for the transfer circuit; and
  partially execute failure detection for each group of the plurality of groups based on the execution of the failure detection of the transfer circuit.

7. An electronic apparatus, comprising:
an imaging device that includes:
  a stacked chip structure that includes at least two semiconductor chips, wherein
    the at least two semiconductor chips include a first semiconductor chip and a second semiconductor chip,
  the first semiconductor chip includes a pixel circuit,
  the pixel circuit includes a photoelectric conversion element,
  the second semiconductor chip includes an analog-to-digital conversion circuit corresponding to the pixel circuit,
  the analog-to-digital conversion circuit configured to execute analog-to-digital conversion on a specific signal, and
  the analog-to-digital conversion circuit includes:
    a latch circuit configured to retain a digital code after the analog-to-digital conversion; and
    a transfer circuit configured to transfer the digital code after the analog-to-digital conversion; and
  a failure detection circuit configured to:
    write, via the transfer circuit, a test pattern for failure detection to the latch circuit, wherein
      the test pattern is a toggle pattern in which logic of an alternating pattern is inverted in synchronization with a clock signal,
      the clock signal is for generation of the test pattern, and
      the alternating pattern is a pattern in which logic "1" and logic "0" have an alternate arrangement;
    read, via the transfer circuit, the test pattern from the latch circuit;
    compare the read test pattern with a specific value; and
    detect failure of the analog-to-digital conversion circuit based on a result of the comparison.

8. An imaging device, comprising:
a stacked chip structure that includes at least two semiconductor chips, wherein
  the at least two semiconductor chips include a first semiconductor chip and a second semiconductor chip,
  the first semiconductor chip includes a pixel circuit,
  the pixel circuit includes a photoelectric conversion element,
  the pixel circuit is configured to output a signal level and a reset level,
  the second semiconductor chip includes an analog-to-digital conversion circuit corresponding to the pixel circuit,
  the analog-to-digital conversion circuit configured to execute analog-to-digital conversion on each of:
    the signal level to obtain D-phase data, and
    the reset level to obtain P-phase data, and
  the analog-to-digital conversion circuit includes:
    a latch circuit configured to retain a digital code after the analog-to-digital conversion, wherein the latch circuit includes a latch circuit for test-pattern writing, a latch circuit for P-phase reading, and a latch circuit for D-phase reading; and a transfer circuit configured to transfer the digital code after the analog-to-digital conversion, wherein the transfer circuit includes a transfer circuit for test-pattern writing, a transfer circuit for P-phase reading, and a transfer circuit for D-phase reading; and a failure detection circuit configured to:
  write, via the transfer circuit for test-pattern writing, a test pattern for failure detection to the latch circuit for test-pattern writing;
  read, via the transfer circuit for P-phase reading, the test pattern from the latch circuit for P-phase reading;
  compare the read test pattern with a specific value; and
  detect failure of the analog-to-digital conversion circuit based on a result of the comparison.

9. An imaging device, comprising:
a stacked chip structure that includes at least two semiconductor chips, wherein
  the at least two semiconductor chips include a first semiconductor chip and a second semiconductor chip,
  the first semiconductor chip includes a pixel circuit,
  the pixel circuit includes a photoelectric conversion element,
  the second semiconductor chip includes an analog-to-digital conversion circuit corresponding to the pixel circuit,
  the analog-to-digital conversion circuit configured to execute analog-to-digital conversion on a specific signal, and
  the analog-to-digital conversion circuit includes:
    a latch circuit configured to retain a digital code after the analog-to-digital conversion; and
    a transfer circuit configured to transfer the digital code after the analog-to-digital conversion, wherein
  the transfer circuit is divided into a plurality of groups in a unit of a determined number; and
a failure detection circuit configured to:
  write, via the transfer circuit, a test pattern for failure detection to the latch circuit;
  read, via the transfer circuit, the test pattern from the latch circuit;
  compare the read test pattern with a specific value;
  execute failure detection of the transfer circuit based on a result of the comparison; and
  partially execute failure detection for each group of the plurality of groups when the failure detection of the transfer circuit is executed.

* * * * *